(12) United States Patent
Hansen et al.

(10) Patent No.: US 9,211,537 B2
(45) Date of Patent: Dec. 15, 2015

(54) MICROFLUIDIC DEVICE AND METHOD OF USING SAME

(75) Inventors: Carl Lars Genghis Hansen, Vancouver (CA); Carolina Tropini, Vancouver (CA)

(73) Assignee: The University of British Columbia, Vancouver, British Columbia (CA)

(*) Notice: Subject to any disclaimer, the term of this patent is extended or adjusted under 35 U.S.C. 154(b) by 176 days.

(21) Appl. No.: 12/741,880

(22) PCT Filed: Nov. 7, 2008

(86) PCT No.: PCT/CA2008/001985
§ 371 (c)(1),
(2), (4) Date: Aug. 2, 2010

(87) PCT Pub. No.: WO2009/059430
PCT Pub. Date: May 14, 2009

(65) Prior Publication Data
US 2011/0053151 A1 Mar. 3, 2011

Related U.S. Application Data

(60) Provisional application No. 60/996,236, filed on Nov. 7, 2007.

(51) Int. Cl.
B01L 3/00 (2006.01)
C12M 1/00 (2006.01)
B01L 7/00 (2006.01)

(52) U.S. Cl.
CPC ...... *B01L 3/5027* (2013.01); *B01J 2219/00317* (2013.01); *B01J 2219/00396* (2013.01); *B01J 2219/00398* (2013.01); *B01J 2219/00495* (2013.01); *B01J 2219/00529* (2013.01);

(Continued)

(58) Field of Classification Search
CPC ....... B01L 3/5027; B01L 3/0275; B01L 7/52; B01J 2219/00317
USPC ........................................ 422/501; 435/283.1
See application file for complete search history.

(56) References Cited

U.S. PATENT DOCUMENTS 5,128,247 A 7/1992 Koller
5,130,423 A 7/1992 Van Ness et al.

(Continued)

FOREIGN PATENT DOCUMENTS

CN 101910415 A 12/2010
JP 2011504094 A 2/2011

(Continued)

OTHER PUBLICATIONS

Thomas J. Albert et al., Light-Directed 5'->3' Synthesis of Complex Oligonucleotide Microarrays, Nucleic Acids Research, 2003, vol. 321, No. 7, 9 pages.

(Continued)

*Primary Examiner* — Betty Forman
(74) *Attorney, Agent, or Firm* — Ellen M. Bierman; Lowe Graham Jones PLLC

(57) ABSTRACT

A microfluidic device comprising a plurality of reaction chambers in fluid communication with a flow channel formed in an elastomeric substrate, a vapor barrier for preventing evaporation from the plurality of reaction chambers, and a continuous phase fluid for isolation of each of the plurality of reaction chambers.

11 Claims, 15 Drawing Sheets

(52) U.S. Cl.
CPC .............. B01J2219/00596 (2013.01); B01J 2219/00608 (2013.01); B01J 2219/00659 (2013.01); B01J 2219/00722 (2013.01); B01L 3/5025 (2013.01); B01L 3/50273 (2013.01); B01L 3/50851 (2013.01); B01L 3/502723 (2013.01); B01L 7/52 (2013.01); B01L 2200/0605 (2013.01); B01L 2200/0621 (2013.01); B01L 2200/0642 (2013.01); B01L 2200/0689 (2013.01); B01L 2200/16 (2013.01); B01L 2300/0819 (2013.01); B01L 2300/0829 (2013.01); B01L 2300/0864 (2013.01); B01L 2300/123 (2013.01); B01L 2300/1805 (2013.01); B01L 2400/0487 (2013.01)

(56) References Cited

U.S. PATENT DOCUMENTS

| | | | |
|---|---|---|---|
| 5,210,015 | A | 5/1993 | Gelfand et al. |
| 5,487,972 | A | 1/1996 | Gelfand et al. |
| 5,674,743 | A | 10/1997 | Ulmer |
| 5,942,443 | A | 8/1999 | Parce et al. |
| 5,945,515 | A | 8/1999 | Chomczynski |
| 5,989,431 | A | 11/1999 | Evans et al. |
| 6,025,136 | A | 2/2000 | Drmanac |
| 6,043,080 | A | 3/2000 | Lipshutz et al. |
| 6,126,899 | A * | 10/2000 | Woudenberg et al. .......... 422/50 |
| 6,143,496 | A | 11/2000 | Brown et al. |
| 6,268,490 | B1 | 7/2001 | Imanishi et al. |
| 6,270,961 | B1 | 8/2001 | Drmanac |
| 6,408,878 | B2 | 6/2002 | Unger et al. |
| 6,481,453 | B1 | 11/2002 | O'Connor et al. |
| 6,500,650 | B1 | 12/2002 | Stanton, Jr. et al. |
| 6,540,895 | B1 | 4/2003 | Spence et al. |
| 6,555,389 | B1 | 4/2003 | Ullman et al. |
| 6,632,655 | B1 | 10/2003 | Mehta et al. |
| 6,793,753 | B2 | 9/2004 | Unger et al. |
| 6,794,499 | B2 | 9/2004 | Wengel et al. |
| 6,872,530 | B2 | 3/2005 | Liu |
| 6,899,137 | B2 | 5/2005 | Unger et al. |
| 6,929,030 | B2 | 8/2005 | Unger et al. |
| 6,960,437 | B2 | 11/2005 | Enzelberger et al. |
| 6,964,848 | B2 | 11/2005 | Livak et al. |
| 7,034,133 | B2 | 4/2006 | Wengel et al. |
| 7,040,338 | B2 | 5/2006 | Unger et al. |
| 7,118,910 | B2 | 10/2006 | Unger et al. |
| 7,144,616 | B1 | 12/2006 | Unger et al. |
| 7,217,321 | B2 | 5/2007 | Hansen et al. |
| 7,338,760 | B2 * | 3/2008 | Gong et al. ................. 435/6.11 |
| 2002/0029814 | A1* | 3/2002 | Unger et al. ................. 137/824 |
| 2003/0138941 | A1 | 7/2003 | Gong et al. |
| 2003/0152994 | A1* | 8/2003 | Woudenberg et al. ............ 435/6 |
| 2004/0005613 | A1 | 1/2004 | Norton |
| 2004/0112442 | A1 | 6/2004 | Maerkl et al. |
| 2004/0224380 | A1 | 11/2004 | Chou et al. |
| 2005/0252773 | A1* | 11/2005 | McBride et al. ............. 204/450 |
| 2011/0129841 | A1 | 6/2011 | Heid et al. |
| 2011/0143964 | A1* | 6/2011 | Zhou et al. ................. 506/26 |

FOREIGN PATENT DOCUMENTS

| | | |
|---|---|---|
| WO | 9513399 | 5/1995 |
| WO | 9722719 | 6/1997 |
| WO | 9800231 | 1/1998 |
| WO | 9845481 | 10/1998 |
| WO | 9914226 | 3/1999 |
| WO | 9966071 | 12/1999 |
| WO | 0050172 | 8/2000 |
| WO | 0056746 | 9/2000 |
| WO | 0101025 A3 | 1/2001 |
| WO | 0125248 A2 | 4/2001 |
| WO | 0148190 A2 | 7/2001 |
| WO | 0181631 A1 | 11/2001 |
| WO | 02/02227 A2 | 1/2002 |
| WO | 0228875 A2 | 4/2002 |
| WO | 0243615 A2 | 6/2002 |
| WO | 03006475 A2 | 1/2003 |
| WO | 03/048295 A1 | 6/2003 |
| WO | 2004083430 A2 | 9/2004 |
| WO | 2004/089810 A2 | 10/2004 |
| WO | 2005/107938 A2 | 11/2005 |
| WO | 2005/107938 A3 | 11/2005 |
| WO | 2005107938 A2 | 11/2005 |
| WO | 2006060748 A2 | 6/2006 |
| WO | 2007/011867 A2 | 1/2007 |
| WO | 2007011867 A2 | 1/2007 |
| WO | 2007/028084 A2 | 3/2007 |
| WO | WO2008/063135 * | 12/2008 |
| WO | 2009/059430 A1 | 5/2009 |

OTHER PUBLICATIONS

Megan J. Anderson et al., Phase Knowledge Enables Rational Screens for Protein Crystallization, Proceedings of the National Academy of Sciences, Nov. 7, 2006, vol. 103, No. 45, 6 pages.
Vladimir D. Axelrod et al., Specific Termination of RNA Polymerase Synthesis as a Method of RNA and DNA Sequencing, Nucleic Acids Research, vol. 5, No. 10, Oct. 1978, 16 pages.
A. Aydin et al., Efficient and Cost-Effective Single Nucleotide Polymorphism Detection with Different Fluorescent Applications, Research Report, BioTechniques vol. 31, No. 4, pp. 920-928, Oct. 2001, 7 pages.
Gina Maria Bonora et al., HELP (High Efficiency Liquid Phase) New Oligonucleotide Synthesis on Soluble Polymeric Support, Nucleic Acids Research, vol. 18, No. 11, pp. 3155-3159, Received Mar. 22, 1990, Revised and Accepted May 9, 1990, 5 pages.
Marina Bousquet PHD, et al., Frequent Detection of the JAK2 V617F Mutation in Bone Marrow Core Biopsy Specimens from Chronic Myeloproliferative Disorders Using the TaqMan Polymerase Chain Reaction Single Nucleotide Polymorphism Genotyping Assay. A Retrospective Study with Pathologic Correlations, Human Pathology 2006, Received Feb. 24, 2006, Revised May 11, 2006, Accepted May 2006, pp. 1458-1464, 7 pages.
David D. L. Bowtell, Rapid Isolation of Eukaryotic DNA, Alalytical Biochemistry 162, pp. 463-465, Received Jun. 26, 1986, 3 pages.
T. Burmeister, et al., Quality Assurance in RT-PCR-Based BCR/ABL Diagnostics—Results of an Interlaboratory Test and a Standardization Approach, Bio-Technical Methods Section (BTS), Received Mar. 6, 2000, Accepted Jun. 26, 2000, pp. 1850-1856, 8 pages.
J. Compton, Nucleic Acid Sequence-Based Amplification, Nature, vol. 350, Mar. 7, 1991, 2 pages.
Helen Donis-Keller et al., Mapping Adenines, Guanines, and Pyrimidines in RNA, Nucleic Acids Research, vol. 4, No. 8, Aug. 1977, pp. 2527-2538, 12 pages.
Bradley D. Freeman et al., Template-Directed Dye-Terminator Incorporation with Fluorescence Polarization Detection for Analysis of Single Nucleotide Polymorphisms Implicated in Sepsis, Journal of Molecular Diagnostics, vol. 4, Nov. 2002, pp. 209-215, 7 pages.
Xiaolian Gao et al., In Situ Synthesis of Oligonucleotide Microarrays, Received Sep. 15, 2003, Accepted Sep. 25, 2003, Published online Mar. 10, 2004 in Wiley InterScience, www.interscience.wiley.com, DOI 10.1002/bip.20005, pp. 579-596, 18 pages.
Alexander N. Glazer et al., Stable Dye-DNA Intercalation Complexes as Reagents for High-Sensitivity Fluorescence Detection, Nature, vol. 359, Oct. 29, 1992, pp. 859-861, 3 pages.
Alexander N. Glazer et al., Energy-Transfer Fluorescent Reagents for DNA Analyses, Current Opinion in Biotechnology 1997, 8:94-102, Electronic Identifier: 0958-1669-008-00094, 9 pages.
Carl Hansen et al., Microfluidics in Structural Biology: Smaller, Faster . . . Better, Current Opinion in Structural Biology 2003, 13:538-544, 7 pages.
Carl L. Hansen et al., A Microfluidic Device for Kinetic Optimization of Protein Crystallization and In Situ Structure Determination, Received Nov. 10, 2005, Published on the Web Feb. 15, 2006, J. Am. Chem. Soc. vol. 128, No. 10, 2006, pp. 3142-3143, 2 pages.
J. Ross Hawkings et al., Miniturized Sealed-Tube Allele-Specific PCR, Human Mutation 19:543-553 (2002), Received Sep. 9, 2001,

(56) References Cited

OTHER PUBLICATIONS

Accepted Revised Manuscript Dec. 19, 2001, Published online in Wiley InterScience, www.interscience.wiley.com, pp. 543-553, 11 pages.
Karl H. Hecker et al., High and Low Annealing Temperatures Increase Both Specificity and Yield in Touchdown and Stepdown PCR, Research Reports, BioTechniques 20:478-485 (Mar. 1996), vol. 20, No. 3 (1996), pp. 478-485, 7 pages.
Russell Higuchi, et al., Simultaneous Amplification and Detection of Specific DNA Sequences, BioTechnology vol. 10, Apr. 1992, pp. 413-417, 5 pages.
Marie A. Iannone et al., Multiplexed Single Nucleotide Polymorphism Genotyping by Oligonucleotide Ligation and Flow Cytometry, Cytometry 39:131-140 (2000), Received Sep. 15, 1999, Revision Received Oct. 28, 1999, Accepted Oct. 31, 1999, pp. 131-140, 10 pages.
Fred Russell Kramer et al., RNA Sequencing with Radioactive Chain-Terminating Ribonucleotides, Proceedings of the National Academy of Sciences, vol. 75, No. 11, pp. 5334-5338, Nov. 1978, 5 pages.
Deval A. Lashkari et al., An Automated Multiplex Oligonucleotide Synthesizer: Development of High-Throughput, Low-Cost DNA Synthesis, Proceedings of the National Academy of Sciences, vol. 92, pp. 7912-7915, Aug. 1995, 4 pages.
Billy T. C. Lau, A Complete Microfluidic Screening Platform for Rational Protein Crystallization, Received Aug. 11, 2006, Published on the web Dec. 23, 2006, J. Am. Chem. Soc. vol. 129, No. 3, 2007, pp. 454-455, 2 pages.
Jian Liu et al., Solving the "World-to-Chip" Interface Problem with a Microfluidic Matrix, Analytical Chemistry, vol. 75, No. 18, Sep. 15, 2003, pp. 4718-4723, 6 pages.
Y. M. Dennis Lo et al., Quantitative Analysis of Fetal DNA in Maternal Plasma and Serum: Implications for Noninvasive Prenatal Diagnosis, Am. J. Hum. Genet. 62: 768-775m 1998, Received Dec. 21, 1997, Accepted for publication Jan. 22, 1998, Electronically published Apr. 1, 1998, pp. 768-775, 8 pages.
Larry Malek et al., Nucleic Acid Sequence-Based Amplification (NASBA(tm)), Chapter 36 From: Methods in Molecular Biology, vol. 28: Protocols for Nucleic Acid Analysis by Nonradioactive Probes Edited by: P.G. Isaac, pp. 253-260, 8 pages.
Salvatore A.E. Marras et al., Multiplex Detection of Single-Nucleotide Variations Using Molecular Beacons, Genetic Analysis: Biomolecular Engineering 17 (1999), pp. 151-156, 6 pages.
J. Cooper McDonald et al., Poly(dimethylsiloxane) as a Material for Fabricating Microfluidic Devices, vol. 35, No. 7, Accounts of Chemical Research, Jul. 2002, pp. 491-499, 9 pages.
Glenn McGall et al., Light-Directed Synthesis of High-Density Oligonucleotide Arrays Using Semiconductor Photoresists, Proceedings of the National Academy of Sciences, vol. 93, pp. 13555-13560, Nov. 1996, Applied Physical Sciences, 6 pages.
Donald R. Mills et al, Structured-Independent Nucleotide Sequence Analysis; Proceedings of the National Academy of Sciences, vol. 76, No. 5, pp. 2232-2235, May 1979, Biochemistry, 4 pages.
Matthew J. Moorcroft et al., In Situ Oligonucleotide Synthesis on Poly(dimethylsiloxane): A Flexible Substrate for Microarray Fabrication, Nucleic Acids Research, 2005, vol. 33, No. 8, 10 pages.
Bruce P. Neri et al., Transferring Automation for Large-Scale Development and production of Invader(tm) SNP Assays, In Advances in Nucleic Acid and Protein Analyses, Manipulation, and Sequencing, Proceedings of SPIE, vol. 3926 (2000), pp. 117-125, 9 pages.
Nicola Thelwell et al., Mode of Action and Application of Scorpion Primers to Mutation Detection, Nucleic Acids Research, 2000, vol. 28, No. 19, pp. 3752-3761, 10 pages.
Howard Ochman et al., Genetic Applications of an Inverse Polymerase Chain Reaction, Genetics Society of America, Manuscript received Aug. 8, 1988, Accepted Aug. 8, 1988, pp. 621-623, Nov. 1988, 3 pages.

Elizabeth A. Ottesen et al. Microfluidic Digital PCR Enables Multigene Analysis of Individual Environmental Bacteria, Downloaded from www.sciencemag.org on Dec. 14, 2006, Dec. 1, 2006, vol. 314, pp. 1464-1467, 4 pages.
Fernando Patolsky et al., Deflection of Single-Base DNA Mutations by Enzyme-Amplified Electronic Transduction, Institute of Chemistry, The Hebrew University of Jerusalem, Mar. 2001, vol. 19, Nature Biotechnology, pp. 253-257, 5 pages.
Debra A. Peattie, Direct Chemical Method for Sequencing RNA, Proceedings of the National Academy of Sciences USA, vol. 76, No. 4, pp. 1760-1764, Apr. 1979, Biochemistry, 5 pages.
A. Ranjit Prakash, et al., Small Volume PCR in PDMS Biochips with Integrated Fluid Control and Vapour Barrier, Sensors and Actuators B 113 (2006), pp. 398-409, Received Jul. 29, 2004, Accepted Mar. 18, 2005 Available online Apr. 28, 2005, 12 pages.
Extended European Search Report for Patent Application No. 08846830.1; mailed on Aug. 26, 2011; 10 pages.
Xiaoquan Qi, et al., L-RCA (ligation-rolling circle amplification): A General Method for Genotyping of Single Nucleotide Polymorphisms (SNPs), Nucleic Acids Research, 2001, vol. 29, No. 22, Received Jul. 23, 2001, Revised and accepted Oct. 5, 2001, 7 pages.
John A. Rogers et al., Recent Progress in Soft Lithography, Review Feature, Materials Today, Feb. 2005, pp. 50-56, 7 pages.
Jason T. Roland et al., Synthesis and Single-Molecule Studies of a Well-Defined Biomimetic Modular Multidomain Polymer Using a Peptidomimetic β-Sheet Module, Received Aug. 24, 2004, pp. 14328-14329, J. Am. Chem. Soc., 2 pages.
E.-L. Romppanen, Oligonucleotide Ligation Assay: Applications to Molecular Diagnosis of Inherited Disorders, Scand J. Clin Lab Invest Downloaded from informahealthcare.com by University of British Columbia on Aug. 23, 2010, pp. 123-129, 7 pages.
Kenneth H. Roux, Using Mismatched Primer-Template Pairs in Touchdown PCR, Biotechniques, Benchmarks, vol. 16, No. 5, pp. 812-814, 3 pages.
Stephen R. Quake et al., From Micro- to Nanofabrication with Soft Materials, Science, Nov. 24, 2000, vol. 290, pp. 1536-1540, Downloaded from www.sciencemag.org on Aug. 23, 2010, 6 pages.
A. Simoncsits et al., New Rapid Gel Sequencing Method for RNA, Nature vol. 269, Oct. 27, 1977, pp. 833-836, Received Jul. 26, Accepted Sep. 2, 1977, 4 pages.
Todd Thorsen et al., Microfluidic Large-Scale Integration, Science, Oct. 18, 2002, vol. 298, pp. 580-584, Downloaded from www.sciencemag.org on Aug. 23, 2010, 6 pages.
Sanjay Tyagi et al., Molecular Beacons: Probes that Fluoresce Upon Hybridization, Nature Biotechnology, vol. 14, Mar. 1996, pp. 303-308, 6 pages.
Sanjay Tyagi et al., Multicolor Molecular Beacons for Allele Discrimination, Nature Biotechnology, vol. 16, Jan. 1998, pp. 49-53, 5 pages.
Marc A. Unger et al., Monolithic Microfabricated Valves and Pumps by Multilayer Soft Lithography, Science, vol. 288, Apr. 7, 2000, pp. 113-116, Downloaded from www.sciencemag.org on Aug. 23, 2010, 5 pages.
Maria L. Villahermosa et al., Detection and Quantification of Multiple Drug Resistance Mutations in HIV-1 Reverse Transcriptase by an Oligonucleotide Ligation Assay, Journal of Human Virology, vol. 4, No. 5, Sep./Oct. 2001, pp. 238-248, 11 pages.
Bert Volelstein et al., Digital PCR, Proceedings of the National Academy of Sciences, vol. 96, pp. 9236-9241, Aug. 1999, Genetics, 6 pages.
Luigi Warren, Transcription Factor Profiling in Individual Hematopoietic Progenitors by Digital RT-PCR, Proceedings of the National Academy of Sciences of the United States of America, Nov. 21, 2006, vol. 103, No. 47, pp. 17807-17812, 7 pages.
Younan Xia et al., Soft Lithography, Annu. Rev. Mater. Sci. 1998, vol. 28, pp. 153-184, 32 pages.
Chunsun Zhang et al., Survey and Summary Miniaturized PCR Chips for Nucleic Acid Amplification and Analysis: Latest Advances and Future Trends, Nucleic Acids Research, 2007, vol. 35, No. 13, pp. 4223-4237, Published online Jun. 18, 2007, 15 pages.

(56) References Cited

OTHER PUBLICATIONS

Chunsun Zhang et al., PCR Microfluidic Devices for DNA Amplification, Biotechnology Advances 24 (2006), pp. 243-284, Received Jul. 22, 2005, Received in revised form Oct. 2, 2005, Accepted Oct. 24, 2005, Available online Dec. 2, 2005, 42 pages.

David Zimmern et al., 3'-Terminal Nucleotide Sequence of Encephalomyocarditis Virus RNA Determined by Reverse Transcriptase and Chain-Terminating Inhibitors, Proceedings of the National Academy of Sciences of the United States of America, vol. 75, No. 9, pp. 4257-4261, Sep. 1978, 5 pages.

Yuexing Zhang, Toward the Detection of Single Virus Particle in Serum, Analytical Biochemistry 356 (2006), 161-170, 10 pages.

Office Action in co-pending European Patent Application No. 08 846 830.1 dated Oct. 24, 2013 (6 pages).

Chinese Search Report for co-pending CN Application No. 200880124204.9 dated Feb. 4, 2013, 2 pages.

Randall et al., "Permeation-driven flow in poly(dimethylsiloxane) microfluidic devices," PNAS, vol. 102 No. 31, Aug. 2, 2005, pp. 10813 to 10818.

Heyries et al., "Megapixel digital PCR," Nature Methods, vol. 8 No. 8, Aug. 2011, 5 pages.

* cited by examiner

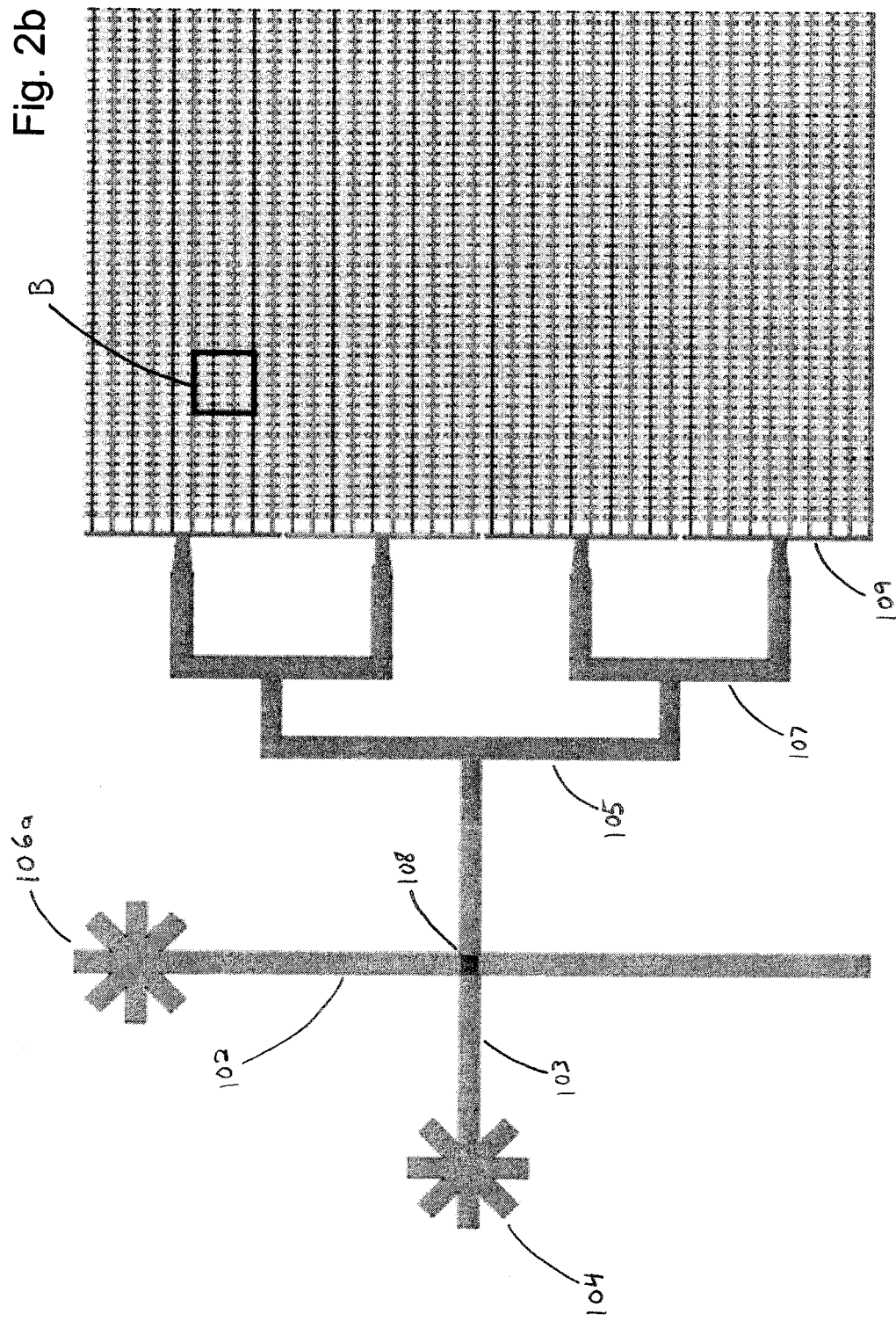

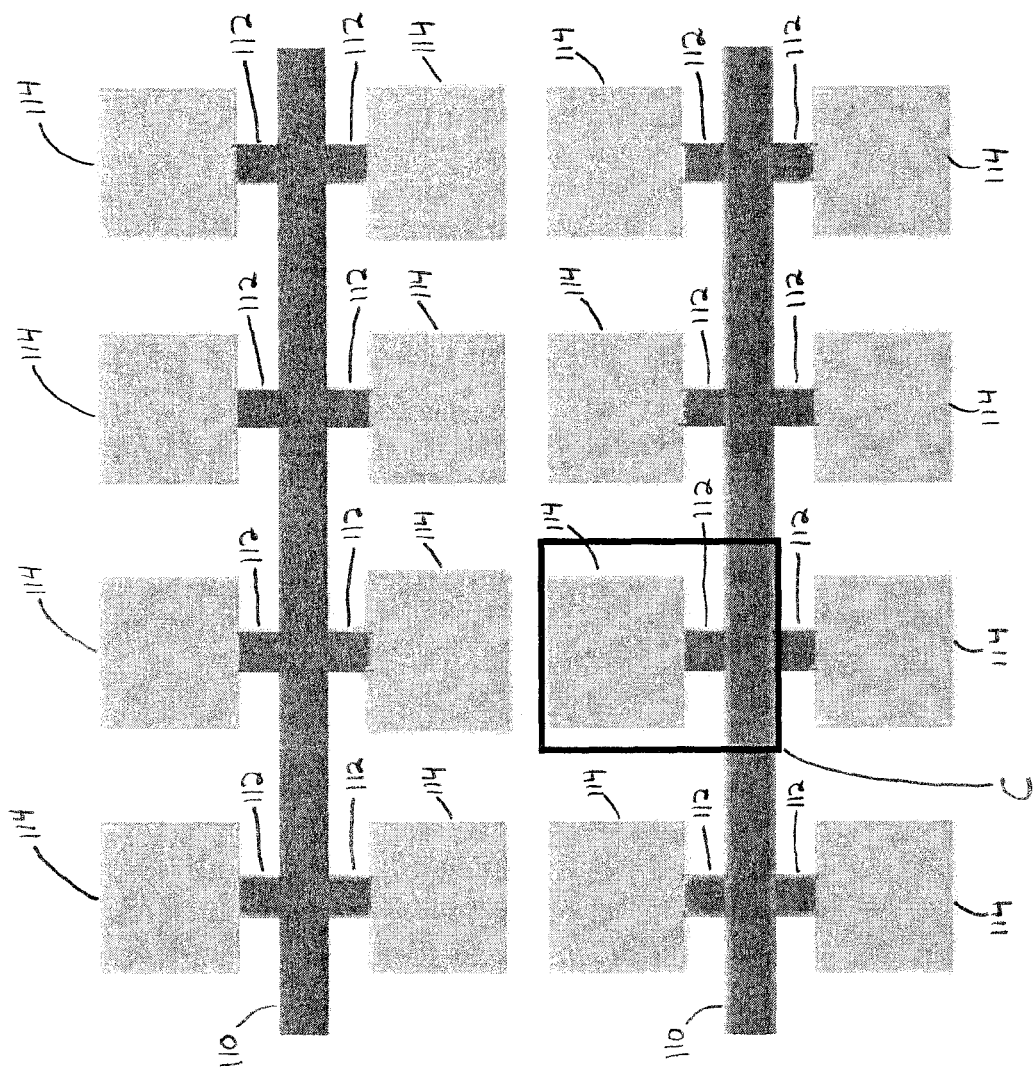

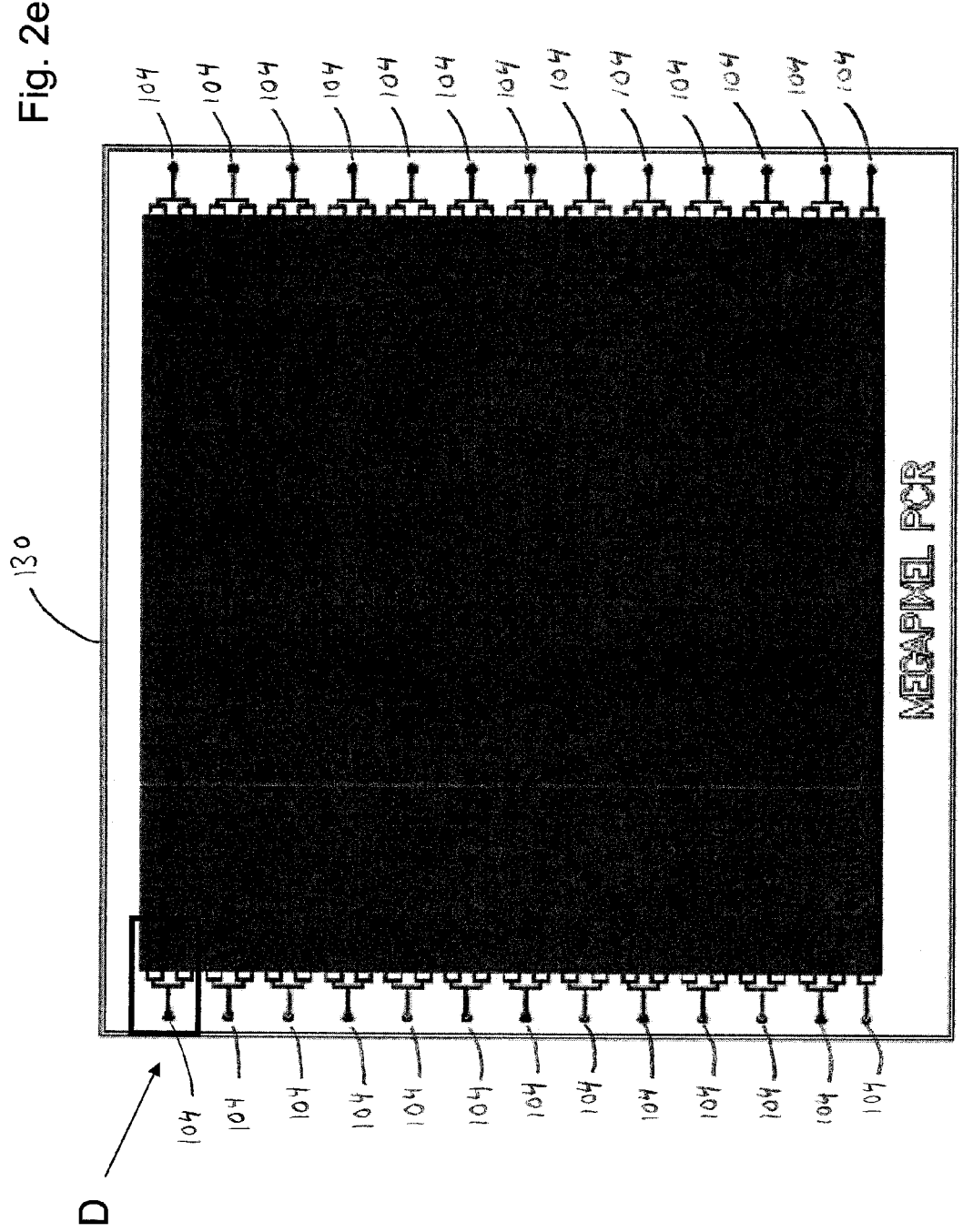

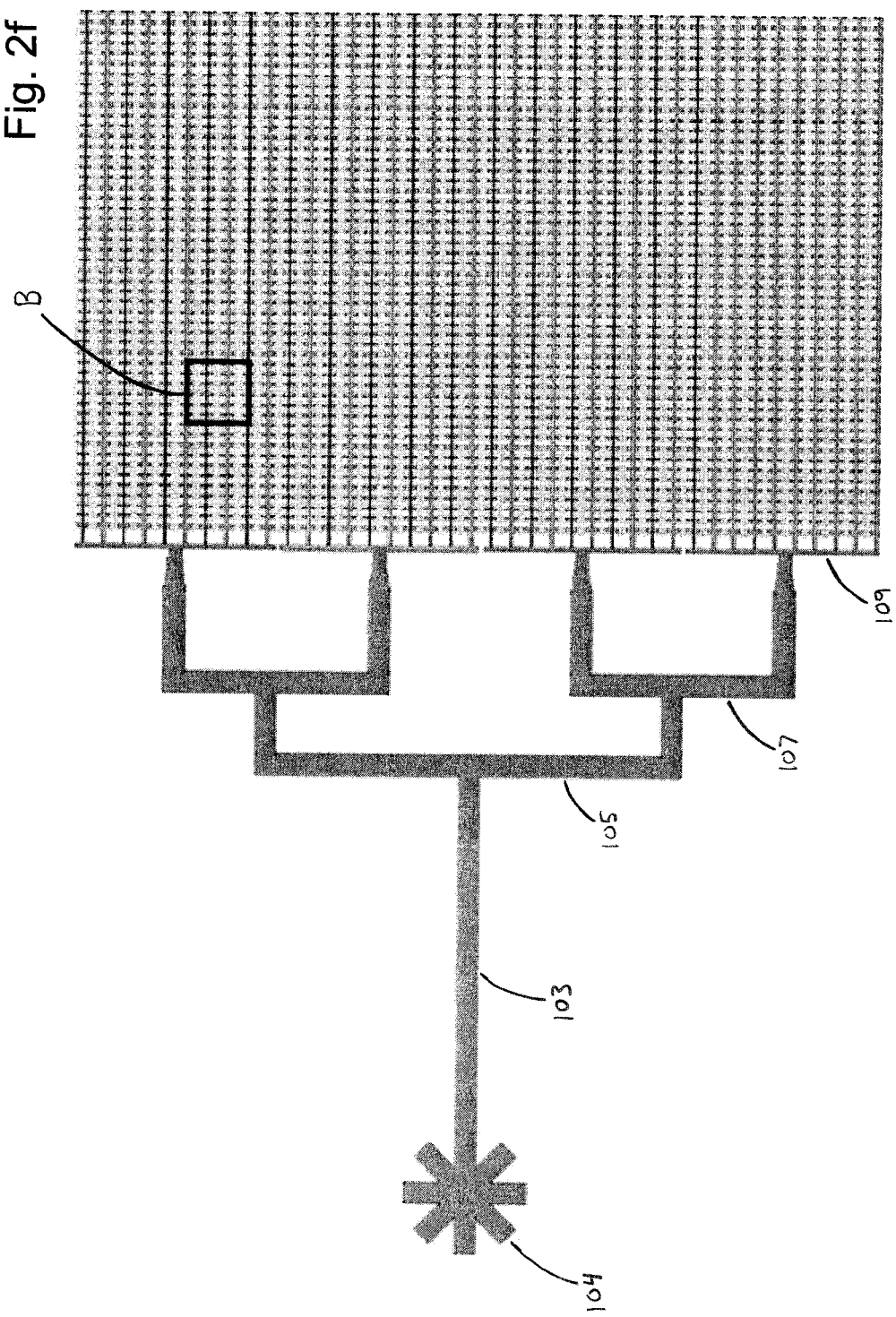

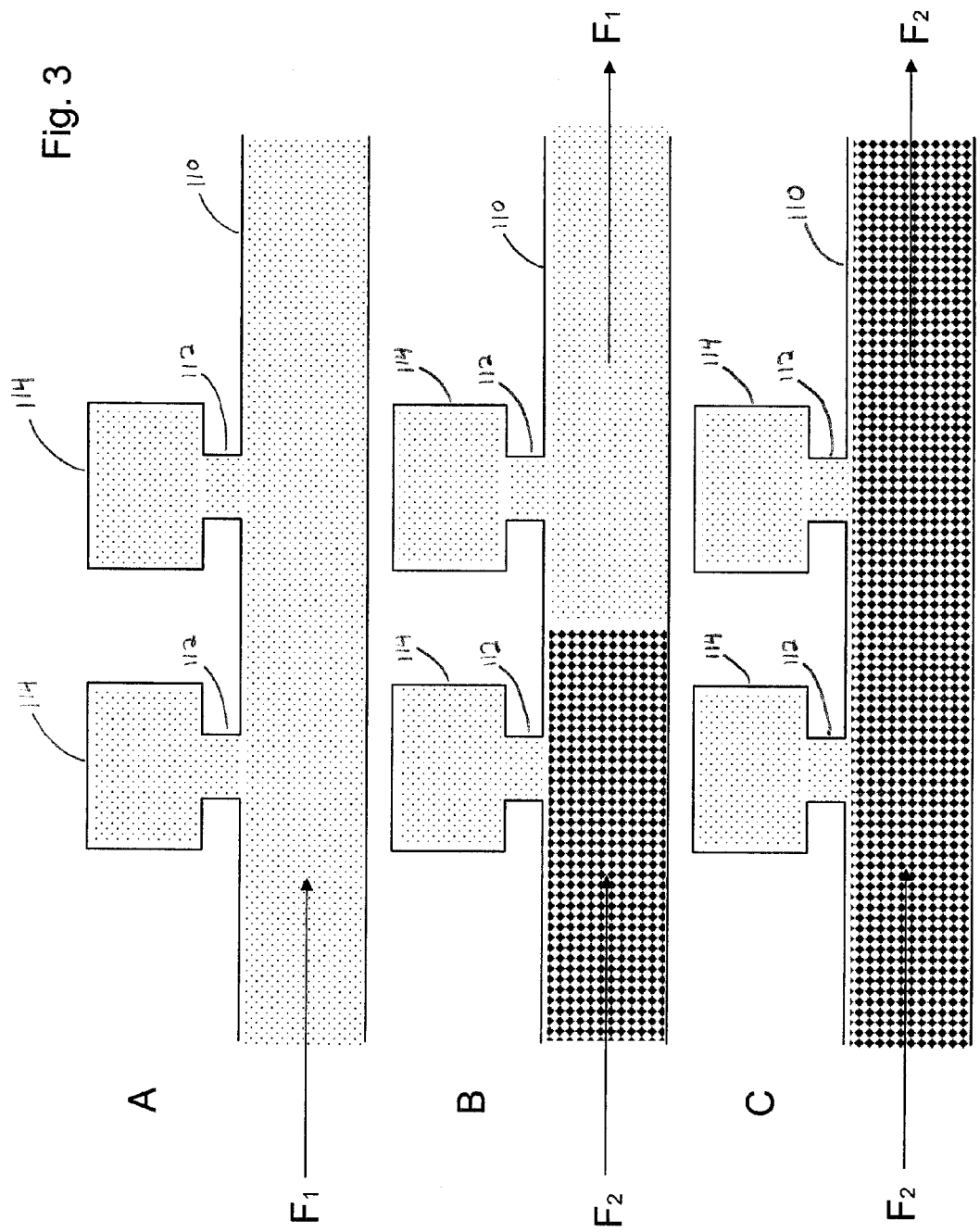

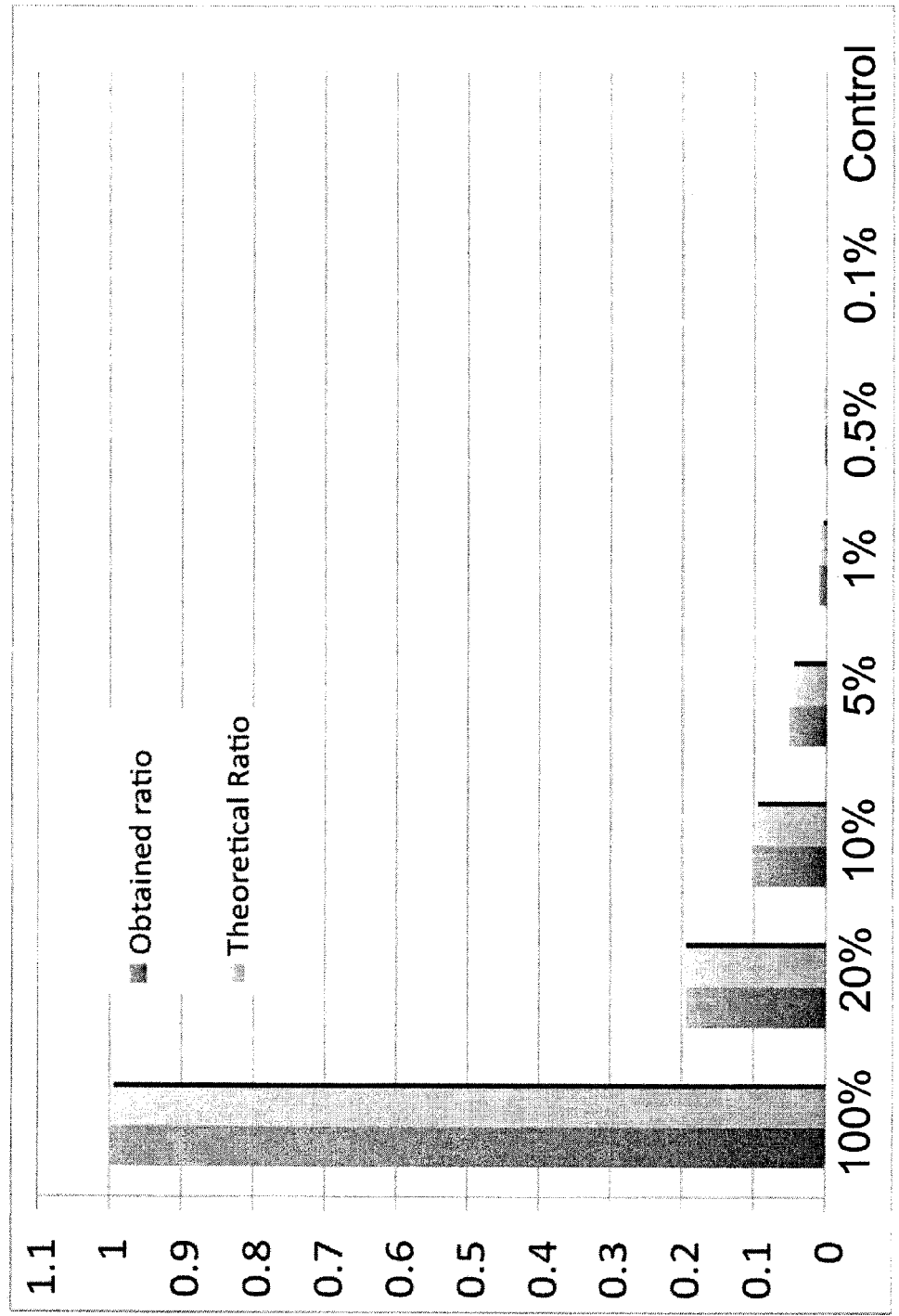

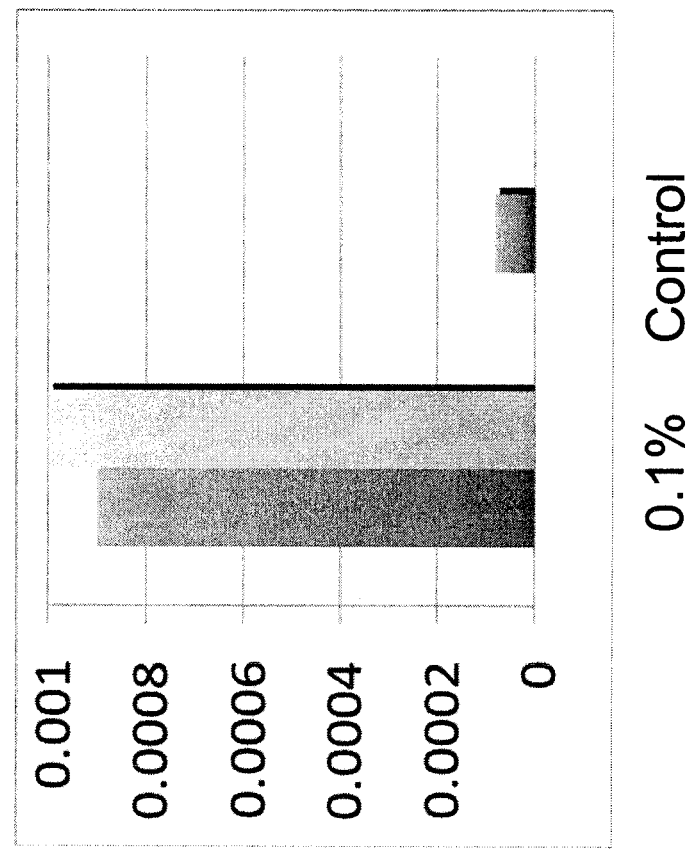

SEQUENCE LISTING

<160> NUMBER OF SEQ ID NOS: 22

<210> SEQ ID NO 1
<211> LENGTH: 97
<212> TYPE: DNA
<213> ORGANISM: Artificial sequence
<220> FEATURE:
<223> OTHER INFORMATION: Response curve template (BCL2)

<400> SEQUENCE: 1
ccggtgccac ctgtggtcca cctgaccctc cgccaggccg gcgacgactt ctcccgccgc        60
taccgccgcg acttcgccga gatgtccagc cagctgc        97

```
<210> SEQ ID NO 2
<211> LENGTH: 18
<212> TYPE: DNA
<213> ORGANISM: Artificial sequence
<220> FEATURE:
<223> OTHER INFORMATION: Response curve primer

<400> SEQUENCE: 2
gccacctgtg gtccacct                                               18

<210> SEQ ID NO 3
<211> LENGTH: 20
<212> TYPE: DNA
<213> ORGANISM: Artificial sequence
<220> FEATURE:
<223> OTHER INFORMATION: response curve primer

<400> SEQUENCE: 3
tggacatctc ggcgaagtcg                                             20

<210> SEQ ID NO 4
<211> LENGTH: 20
<212> TYPE: DNA
<213> ORGANISM: Artificial sequence
<220> FEATURE:
<223> OTHER INFORMATION: 5' Fam-, 3' BHQ-labelled probe

<400> SEQUENCE: 4
cgacgacttc tcccgccgct                                             20

<210> SEQ ID NO 5
<211> LENGTH: 209
<212> TYPE: DNA
<213> ORGANISM: Homo sapien

<400> SEQUENCE: 5
cacatttgga gggcacaaaa gtgagaagcc ggctctgcct cggaagaggg caggggagaa    60
caggtctgac caggtgaccc gaggcacagt aacgcctccc cccaggctgg tgaaaaagaa   120
tgaggaagct gctgatgagg tcttcaaaga catcatggag tccagcccgg gctccagccc   180
gcccaacctg actccaaaac ccctccggc                                    209

<210> SEQ ID NO 6
<211> LENGTH: 20
<212> TYPE: DNA
<213> ORGANISM: Artificial sequence
<220> FEATURE:
<223> OTHER INFORMATION: ABL11 primer

<400> SEQUENCE: 6
atttggaggg cacaaaagtg                                             20

<210> SEQ ID NO 7
<211> LENGTH: 18
<212> TYPE: DNA
<213> ORGANISM: Artificial sequence
<220> FEATURE:
<223> OTHER INFORMATION: ABL11 primer

<400> SEQUENCE: 7
gggggaggcg ttactgtg                                               18
```

```
<210> SEQ ID NO 8
<211> LENGTH: 20
<212> TYPE: DNA
<213> ORGANISM: Artificial sequence
<220> FEATURE:
<223> OTHER INFORMATION: CalOrange labeled probe

<400> SEQUENCE: 8
acaggtctga ccaggtgacc                                            20

<210> SEQ ID NO 9
<211> LENGTH: 18
<212> TYPE: DNA
<213> ORGANISM: Artificial sequence
<220> FEATURE:
<223> OTHER INFORMATION: AIRE primer

<400> SEQUENCE: 9
atcgagcagg agctggag                                              18

<210> SEQ ID NO 10
<211> LENGTH: 20
<212> TYPE: DNA
<213> ORGANISM: Artificial sequence
<220> FEATURE:
<223> OTHER INFORMATION: AIRE primer

<400> SEQUENCE: 10
tgccggtcat agctcttctt                                            20

<210> SEQ ID NO 11

<400> SEQUENCE: 11

000

<210> SEQ ID NO 12
<211> LENGTH: 20
<212> TYPE: DNA
<213> ORGANISM: Artificial sequence
<220> FEATURE:
<223> OTHER INFORMATION: ABL primer

<400> SEQUENCE: 12
atttggaggg cacaaaagtg                                            20

<210> SEQ ID NO 13
<211> LENGTH: 20
<212> TYPE: DNA
<213> ORGANISM: Artificial sequence
<220> FEATURE:
<223> OTHER INFORMATION: ABL primer

<400> SEQUENCE: 13
aggggttttg gagtcaggtt                                            20

<210> SEQ ID NO 14
<211> LENGTH: 20
<212> TYPE: DNA
<213> ORGANISM: Artificial sequence
<220> FEATURE:
<223> OTHER INFORMATION: CalOrange labelled probe for ABL

<400> SEQUENCE: 14
acaggtctga ccaggtgacc                                            20
```

<210> SEQ ID NO 15

<400> SEQUENCE: 15

000

<210> SEQ ID NO 16

<400> SEQUENCE: 16

000

<210> SEQ ID NO 17
<211> LENGTH: 25
<212> TYPE: DNA
<213> ORGANISM: Artificial sequence
<220> FEATURE:
<223> OTHER INFORMATION: forward JAK primer

<400> SEQUENCE: 17
aagctttctc acaagcattt ggttt                                   25

<210> SEQ ID NO 18
<211> LENGTH: 26
<212> TYPE: DNA
<213> ORGANISM: Artificial sequence
<220> FEATURE:
<223> OTHER INFORMATION: reverse JAK primer

<400> SEQUENCE: 18
agaaaggcat tagaaagcct gtagtt                                  26

<210> SEQ ID NO 19
<211> LENGTH: 17
<212> TYPE: DNA
<213> ORGANISM: Artificial sequence
<220> FEATURE:
<223> OTHER INFORMATION: wild-type JAK probe (VIC label)

<400> SEQUENCE: 19
tctccacaga cacatac                                            17

<210> SEQ ID NO 20
<211> LENGTH: 15
<212> TYPE: DNA
<213> ORGANISM: Artificial sequence
<220> FEATURE:
<223> OTHER INFORMATION: JAK probe for polymorphism (FAM label)

<400> SEQUENCE: 20
tccacagaaa catac                                              15

<210> SEQ ID NO 21
<211> LENGTH: 21
<212> TYPE: DNA
<213> ORGANISM: Artificial sequence
<220> FEATURE:
<223> OTHER INFORMATION: Jak2fwd

<400> SEQUENCE: 21
tcctcagaac gttgatggca g                                       21

<210> SEQ ID NO 22
<211> LENGTH: 23
<212> TYPE: DNA
<213> ORGANISM: Artificial sequence

```
<220> FEATURE:
<223> OTHER INFORMATION: Jak2rev

<400> SEQUENCE: 22
attgctttcc tttttcacaa gat                                          23
```

MICROFLUIDIC DEVICE AND METHOD OF USING SAME

This application claims priority to U.S. Provisional Application 60/996,236 filed Nov. 7, 2007, which is herein incorporated by reference in its entirety.

FIELD OF THE INVENTION

The present invention relates to a microfluidic device.

BACKGROUND OF THE INVENTION

Current microfluidic devices ("chips") and systems allow for semi-automated and automated manipulation of small volumes, generally a few nanoliters. The miniaturization of sample processing and assaying provides for both increased speed and sensitivity, as well as an economy of scale—less reagent, sample and space is required to run the assay and obtain the desired information, and the decreased handling of individual samples and reagents reduces opportunity for error. Microfluidic devices and systems have been adapted, or proposed for use with a variety of chemical and biochemical analyses including protein crystallography, cell free protein synthesis, gas chromatography, cell separation, electrophoresis, polymerase chain reaction (PCR) and the like.

The advent of PCR and other nucleic acid-based methodologies, and completion of the sequencing of the human genome has led to various nucleic acid based diagnostics ant tests which continue to demand more precise and sensitive analytical tools. Knowledge of gene expression, polymorphisms, mutations (heritable or otherwise) and the like have been translated into improvements in health care—this in turn has demanded more precise and sensitive analytical tools. Earlier detection and diagnosis of genetic disease, cancer and infection provides immediate beneficial impact—early stages of disease may be treated more efficiently, and often with a greater degree of success, thus greatly improving subject outcome and quality of life.

Quantitative real-time PCR (RT-PCR) is a current 'gold standard' for detection of relatively rare polymorphisms, however it requires a difference of ~20% or greater to be present in the sample before the difference is reliably detected. As PCR is an exponential technique, it is inherently very sensitive and in principal allows for the detection of single molecules. However, any non-specific amplification or contamination may lead to false positives, thereby making it very difficult to reliably detect rare sequences. This is particularly true when target sequences are very similar to other species that may be present at higher levels, and thus may limit the sensitivity of an assay in detecting rare molecular species—the presence of a single nucleotide polymorphism in rare population of cancer cells may be invisible due to high background of normal molecules with nearly identical sequence. Additionally, the real-time monitoring of an exponential reaction has high dynamic range but limited discriminatory power—differences below approximately 20% in the relative abundance of two sequences may be difficult to detect. In many applications a far greater sensitivity may be required. As an example, the detection of fetal aneuploidy from circulating blood would require accurate detection of allelic differences of approximately 1-6% Lo et al., 1998. Am J Human Genetics).

Digital PCR was initially described by Vogelstein and Kinzler in 1999 (Proc. Natl Acad. Sci USA 96:9236-9241). Digital PCR techniques provide for amplification of single molecules, however macroscopic implementations in microliter volume reactors using conventional 96 and 384 well plates may have to overcome non-specific amplification, contamination, high reagent costs, and modest numbers of reactions. Performing quantitative analysis by digital PCR therefore requires the reliable amplification of single molecules with low false positive rates—something that typically requires careful optimization in microliter volume reactors. In addition, the precision of analysis by digital PCR is dependant on the number of reactions. Reliable detection of a 1% difference would require hundreds of thousands to millions of reactions. This is not practical using existing methods.

Emerging microfluidic technologies provide increased sensitivity through small volume compartmentalization, high scalability, and economy of scale, thereby allowing for the full power of digital PCR to be realized.

Scaling down the size of an assay brings more than just an economy of scale—smaller samples may be used and more tests run on one sample is the most obvious benefit, however biological assays that were impractical, or not possible using 'conventional' volumes and samples sizes may also be enabled. In some cases, the conventional assays may simply be scaled down—for example use of 1 ul volumes instead of 100 ul; while in other cases, significant modification may be needed, in either the way the assay is set up, the data analysed or in other respects. Zhang et al., 2006 (Biotechnology Advances 24:243-284) reviews PCR microfluidic devices for DNA amplification and various methods, materials and techniques that may lend themselves to microfluidics applications.

The compartmentalization of solutions into a large number of small-volume reactions is useful in many fields. Microfluidic devices comprising valves and fluid channels allow for a planar (2-dimensional) emulsion to be formed with a regular spatial arrangement. This regular array has the advantage that it is possible to track or image each droplet over time. This is particularly important in assays that require time-monitoring of a readout (for example real time polymerase chain reaction). Furthermore, such methods allow for precisely defined arrays in which every drop has substantially the same volume.

Microfluidic digital PCR using compartmentalization by valves has been employed in multigene analysis of environmental bacteria (Warren et al., 2006. PNAS 103:17807-17812), and for transcription factor profiling of hematopoetic cells (Ottesen et al, 2006. Science 314:1464-1467). The microfluidic devices used in these experiments provide a compartmentalized array of approximately 9000 individual 10 nL reactions.

The achievable density and minimum volume of PCR reactions in current microfluidic devices may be subject to practical limitations. As the density of the array is increased, the volume of the individual reaction chambers is decreased, and valves may occupy too much space to be feasible. A maximum density at which microfluidic valves may be reliably fabricated (typically ~2500 $cm^2$, based on a 50×50 chamber array with a pitch of about 200 μm provides an upper limit to the number of individual valve-defined reaction chambers that may be fabricated (Thorsen et al., 2002. Science 298: 580-584 and 2) the minimum volume of a PCR reaction that can be implemented in a gas permeable elastomer device without excessive reagent evaporation during thermocycling (~1 nL). Density and scale are particularly important in digital PCR since accurate measurements require the compartmentalization of a single sample into thousands to millions of individual reactions, making it expensive in terms of both device area and reagent consumption. New methods for dramatically increasing assay density and reducing assay volume are therefore the central issue in realizing the full potential of this technique.

While a variety of materials are known and used in microfluidics applications, silicone rubber materials (e.g. polydimethylsiloxane, or PDMS) are preferred for the ease of handling and suitability to monolithic construction of microfluidic devices, PDMS exhibits a high gas permeability, making it possible to fill dead-end structures. In addition, PDMS has a high permeability to water vapour. Thus, some processes that are carried out in PDMS-constructed microfluidic devices—particularly where elevated temperatures are required, such as PCR may suffer from drying out of the small aqueous reaction volume due to rapid evaporation, and the reactions may fail.

Attempts to overcome this limitation have employed the use of external hydration methods. While this manages to reduce evaporation rates somewhat, the sample volume sizes that are able to be used successfully are still limited by evaporation even using this hydration. This limits the ability of such systems to incorporate very small volume sample sizes (e.g. on the order of picoliters or smaller) that would enable high density arrays—and thus large sample numbers to improve the utility of the devices.

U.S. Pat. No. 7,118,910 discloses a microfluidic device for performing PCR assays, and further discloses use of fluid-filled guard channels in a microfluidic device to reduce evaporation of fluid from the device.

U.S. Pat. No. 6,555,389 discloses a method for compensation for evaporation in a microfluidic device by replenishing fluid lost by evaporation from a reservoir of fluid, via capillary channels.

SUMMARY OF THE INVENTION

The present invention relates to a microfluidic device. The present invention also relates to a microfluidic device comprising a plurality of reaction chambers in fluid communication with a flow channel formed in an elastomeric substrate, a vapor barrier for preventing evaporation from the plurality of reaction chambers, and a continuous phase fluid for isolation of each of the plurality of reaction chambers. Methods for digital quantification of a target nucleic acid, using the microfluidic device are also provided.

The present invention provides for a microfluidic device that provides an improvement in the density of reaction chambers by three orders of magnitude, achieving densities of up to about 10,000,000 reaction chambers per square inch (about $1.5 \times 10^6/cm^2$) while reducing the volume of each assay by a commensurate amount. The device provides for assay compartmentalization in pL-volume emulsion arrays without the need for valves to segregate individual reaction chambers.

In accordance with one aspect of the present invention, there is provided a microfluidic device comprising a plurality of reaction chambers in fluid communication with a flow channel formed in an elastomeric substrate, a vapor barrier for preventing evaporation from the plurality of reaction chambers, and a continuous phase fluid for isolation of each of the plurality of reaction chambers.

In accordance with one aspect of the present invention, there is provided a microfluidic device comprising a plurality of reaction chambers in fluid communication with a flow channel formed in an elastomeric substrate; and a vapor barrier applied coplanar to the plurality of reaction chambers and separated from the reaction chambers by a layer of elastomer.

In accordance with another aspect of the invention, the microfluidic device further comprises a plurality of valves disposed along the flow channel, each of the plurality of valves comprising one or more control channels intersecting the flow channel.

In accordance with another aspect of the invention, the valves are positioned at first and second ends of the flow channels.

In accordance with another aspect of the invention, the reaction chambers are of picoliter or femtoliter volume.

In accordance with another aspect of the invention, the reaction chamber is a blind reaction chamber.

In accordance with another aspect of the invention, the reaction chamber has one or more pre-deposited reagents.

In accordance with another aspect of the invention, the reaction chambers are present at a density of 5000 or greater chambers/$cm^2$.

In accordance with another aspect of the present invention, there is provided a method of compartmentalizing a fluid in a microfluidic device, comprising a plurality of reaction chambers in fluid communication with a flow channel with a first fluid; flushing the flow channel with a second fluid and displacing the first fluid from the flow channel and not from the reaction chambers, the second fluid being immiscible with the first fluid; wherein the first fluid in each of the plurality of reaction chambers is isolated from the first fluid in each of the other reaction chambers by the second fluid in the flow channel.

In accordance with one aspect of the invention, there is provided a method for digital quantification of a target nucleic acid, the method comprising filling a plurality of reaction chambers in fluid communication with a flow channel of a microfluidic array, with a first fluid comprising a target nucleic acid; flushing the flow channel with a second fluid and displacing the first fluid from the flow channel and not from the reaction chambers, the second fluid being immiscible with the first fluid; wherein the first fluid in each of the plurality of reaction chambers is isolated from the first fluid in each of the other reaction chambers by the second fluid in the flow channel; and incubating the microfluidic array.

In accordance with another aspect of the invention, the reaction chambers are of picoliter or femtoliter volume.

In accordance with another aspect of the invention, the first fluid is a aqueous solution.

In accordance with another aspect of the invention, the second fluid is a non-aqueous fluid.

In accordance with another aspect of the invention, the first fluid comprises a reaction mix for PCR.

In accordance with another aspect of the invention, the first fluid comprises a sample.

In accordance with another aspect of the invention, the reaction chambers are blind reaction chambers.

In accordance with another aspect of the invention, the reaction chambers have one or more pre-deposited reagents.

In accordance with another aspect of the invention, the target nucleic acid is at a suitable concentration in the first fluid to provide less than about one target nucleic acids per reaction chamber, averaged over the plurality of reaction chambers.

In accordance with another aspect of the invention, the target nucleic acid is at a suitable concentration in the first fluid to provide less than about 0.5 target nucleic acids per reaction chamber, averaged over the plurality of reaction chambers.

In accordance with another embodiment of the invention, the step of incubating comprises thermocycling.

In accordance with another aspect of the invention, there is provided a microfluidic device comprising a plurality of reaction chambers in connection with a flow channel formed in an elastomeric substrate; and a fluid barrier preventing fluid communication between two or more reaction chambers.

In accordance with another aspect of the invention, the device further comprises a vapor barrier applied coplanar to the plurality of reaction chambers and separated from the reaction chambers by a layer of elastomer.

This summary of the invention does not necessarily describe all features of the invention. Other aspects, features and advantages of the present invention will become apparent to those of ordinary skill in the art upon review of the following description of specific embodiments of the invention.

BRIEF DESCRIPTION OF THE DRAWINGS

These and other features of the invention will become more apparent from the following description in which reference is made to the appended drawings wherein:

FIG. 3 shows a schematic representation of isolation of a fluid in reaction chambers. In (A), the channel and reaction chambers are filled with a first fluid ($F_1$—dots). In (B), a second fluid ($F_2$—checks) is introduced to flow into the channel, the second fluid displaces the first fluid from the channel, however the first fluid remains in the reaction chamber (is "broken off" by the flow of the second fluid) In (C), the first fluid is displaced from the channel and remains only in the reaction chambers, and in a portion of the reaction chamber access channel. Direction of fluid flow is indicated by the arrows.

FIG. 8 shows the results of an assay detecting different ratios of wild-type to V617 mutants in JAK2. Differing amounts of mutant plasmid were added to a constant amount of wild-type (fill factor of 0.5). (A) shows the obtained ratio (dark bar) and the theoretical ratio (light bar). (B) shows the same ratios as in A, but for the 0.1% and control samples.

DETAILED DESCRIPTION

Figure 1:
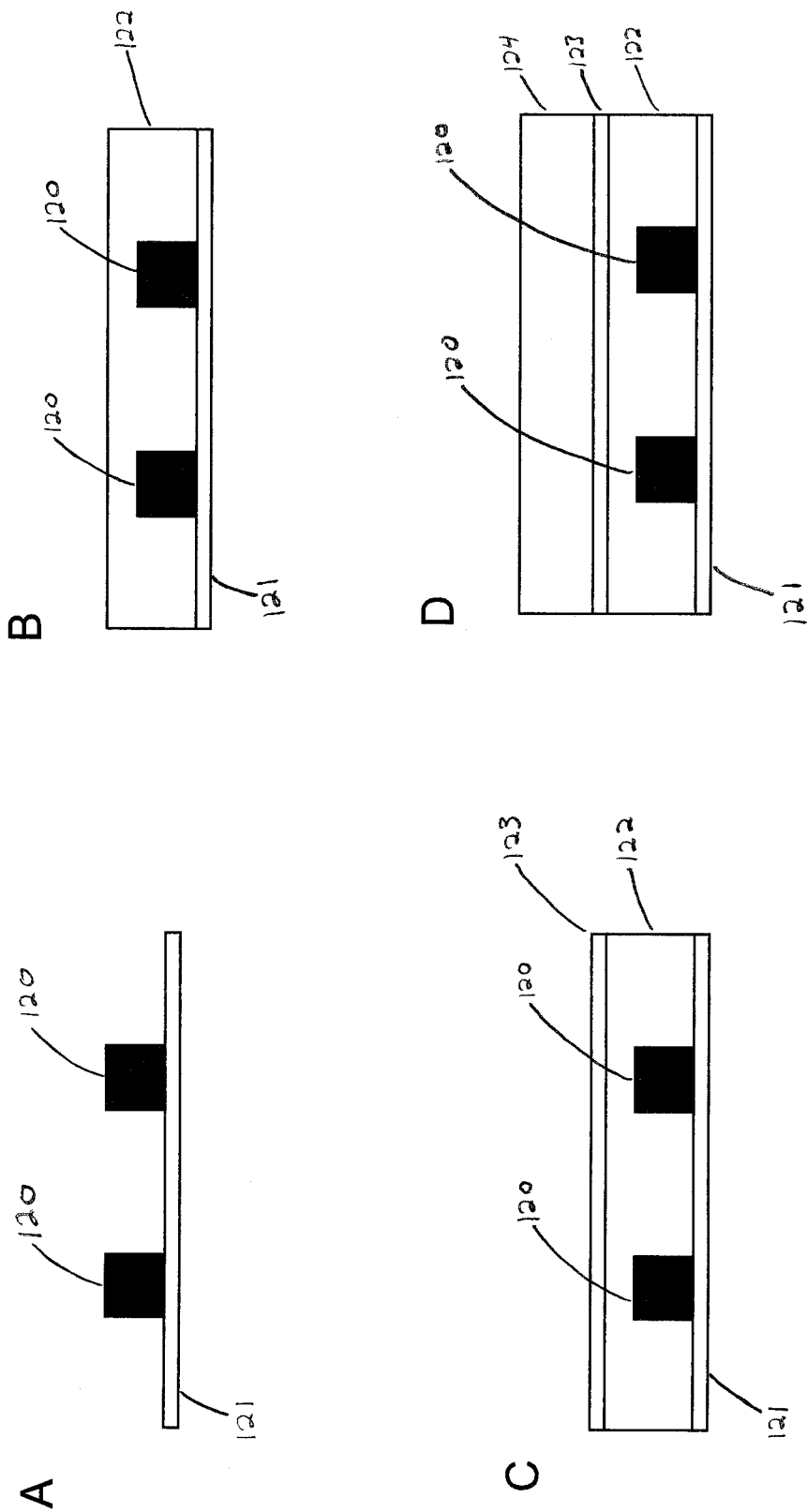
FIG. 1 shows a schematic representation of a fabrication process for a microfluidic device.

The present invention relates to a microfluidic device comprising a plurality of reaction chambers in fluid communication with a flow channel formed in an elastomeric substrate, a vapor barrier overlaying the plurality of reaction chambers, and a continuous phase fluid for isolation of each of the plurality of reaction chambers. Methods for digital quantification of a target nucleic acid, using the microfluidic device are also provided.

A "flow channel" refers generally to a path though which a fluid may flow.

A "reaction chamber", a "reaction well" or a "well" is a bounded region where a chemical or enzymatic reaction occurs. It may be bounded by a wall and one or more valves. Alternately, a reaction chamber may be bounded by walls and a fluid barrier. A 'wall' of a reaction chamber includes all surfaces—fluid, solid or semi-solid—bounding the chamber. A reaction chamber is connected to one or more flow channels; the connection comprising an opening that allows for filling and/or emptying of the reaction chamber via the one or more flow channels. The plurality of reaction chambers in a microfluidic device according to some embodiments of the invention may be arranged in a regular array—this arrangement may be referred to as a microfluidic array.

An "isolated reaction chamber" is a reaction chamber that is not in fluid communication with another reaction chamber or flow channel. The fluid communication may be prevented by a valve, for example, or by a fluid barrier. The fluid barrier may be, for example, formed by a fluid immiscible with the material (usually another fluid) in the reaction chamber.

A "blind reaction chamber" is one with a single access port or opening that allows for entrance of a fluid, but lacks a separate exit.

A "dead-end fill" is a method of filling dead-end or blind reaction chambers with a fluid under pressure. When a fluid is initially injected into a channel structure, it will follow the path of least resistance, and leave some regions unfilled, or partially filled. The gas-permeability of some elastomeric materials used in microfluidic fabrication may be exploited to allow for dead-end channels to be filled. By closing all of the exit valves and injecting the fluid under pressure (up to about 300 psi or about 200 kPa), the pressurized fluid fills the channels and compressing any gas (air) in the chambers or channels of the device. The pressurized gas will diffuse out through the elastomer, leaving behind dead-end or blind reaction chambers filled with the fluid.

A "reagent" refers broadly to any agent used in a reaction, other than the analyte (for example, the cell, metabolite, or nucleic acid being analyzed). Examples of reagents for a nucleic acid amplification reaction include, but are not limited to, buffers, surfactants, metal ions, DNA or RNA polymerase, reverse transcriptase, kinases or phosphatases, primers, template or target nucleic acid, nucleotides, labels, dyes, nucleases and the like. Reagents for enzyme reactions include, for example, substrates, cofactors, buffer, metal ions, inhibitors and activators. Reagents for cell-based reactions include, but are not limited to, the above reagents for enzyme reactions or nucleic acid detection, as well as cells, cell specific dyes, or ligands (e.g., agonists and antagonists) that bind to cellular receptors. A surfactant such as TWEEN-20 may be included in the reaction mixture to reduce adsorption of reagents to the elastomer surface.

A primer is a short (generally 10-30 nucleotides) nucleic acid or oligonucleotide that is annealed to a target nucleic acid and extended by a nucleic acid polymerase. A primer may be perfectly complementary to the target nucleic acid (100% match between all nucleotides of the primer and target nucleic acid), or may be substantially complementary (less than 100%) so that the primer hybridizes selectively at a site of the target nucleic acid.

A probe is a nucleic acid sequence that specifically hybridizes with a target nucleic acid. The hybridization is detectable, for example by a fluorescent label or dye that has modified fluorescent properties only with formation of the double stranded configuration (for example a DNA staining dye) or by fluorescence (for example a molecular beacon). A probe may be of any suitable length to provide sufficient complementarity to the target nucleic acid sequence and anneal under the reaction conditions. Probes used in hybridization may include double-stranded DNA, single-stranded DNA and RNA oligonucleotides, locked nucleic acid (LNA) probes, and peptide nucleic acids. Hybridization methods for the identification of single nucleotide polymorphisms or other mutations involving a few nucleotides are described in the U.S. Pat. Nos. 6,270,961; 6,025,136; and 6,872,530. Suitable hybridization probes for use in accordance with the invention include oligonucleotides, polynucleotides, LNAs and PNAs in a range of lengths, from about 6 to about 400 nucleotides, from about 20 to about 200 nucleotides, or from about 30 to about 100 nucleotides in length.

An oligonucleotide is a variable length nucleic acid, which may be useful as probes, primers for the detection and/or amplification of specific nucleic acids. Numerous methods are known in the art for synthesizing oligonucleotides—see, for example, Bonora G M. et al. Nucleic Acid Res. (1990) 18(11):3155-9; Lashkari D A. et al. PNAS (1995) 92(17): 7912-5; McGall G. et al. PNAS (1996) 93(24):13555-60; Albert T J. et al. Nucleic Acid Res. (2003) 31(7):e35; Gao X. et al. Biopolymers (2004) 73(5):579-96; and Moorcroft M J. et al. Nucleic Acid Res. (2005) 33(8):e75). Gait, pp. 1-22; Atkinson et al., pp. 35-81; Sproat et al., pp. 83-115; and Wu et al., pp. 135-151, in Oligonucleotide Synthesis: A Practical Approach, M. J. Gait, ed., 1984, IRL Press, Oxford; or Molecular Cloning: a Laboratory Manual $3^{rd}$ edition. Sambrook and Russell. CSHL Press, Cold Spring Harbour, N.Y.

Some nucleic acids or oligonucleotides may incorporate monomers that provide for altered or improved enzymatic stability, or conformational restriction in the oligonucleotide. For example, bicyclic nucleosides may provide conformational restriction to the oligonucleotide, and may provide varying hybridization or stability profiles compared to unmodified oligonucleotides. An LNA nucleoside is an example of a bicyclic nucleoside, having a 2'-4' cyclic linkage as described in U.S. Pat. No. 6,268,490, U.S. Pat. No. 6,794, 499, U.S. Pat. No. 7,034,133 (each of which are incorporated herein by reference). Methods of synthesis and polymerization of nucleic acid polymers comprising LNA monomers are described in, for example, WO 99/14226, WO 00/56746, WO 00/56748, WO 01/25248, WO 0148190, WO 02/28875, WO 03/006475, WO 03/09547, WO 2004/083430, U.S. Pat. No. 6,268,490, U.S. Pat. No. 6,794,499, U.S. Pat. No. 7,034,133.

A "one-pot" process or reaction is a process carried out in a single reaction chamber without multiple separate steps of addition and reaction of reagents. In a one-pot reaction, the reagents necessary for the reaction are admixed together in a single reaction medium, substantially at the same time. For example, a one-pot PCR reaction may combine the reagents for both the amplification reaction and detection in a single reaction chamber—both amplification and detection are carried out in the same reaction chamber. A reaction mix comprising all reagents necessary for amplification and detection of a specific target nucleic acid (including target nucleic acid, primers, probe, polymerase, nucleotides, buffer, salts and the like) may be combined, and this single mixture injected into a microfluidic device of the present invention. All reaction chambers are filled with the reaction mixture, the chambers isolated and the thermal cycling performed. Detection of the specific amplified product may be performed as thermal cycling is occurring, or afterwards, or both. As a variant on a one-pot process, a reagent may be placed in an array or sub-array of reaction chambers of a microfluidic device of the present invention during synthesis of the device or afterward. A reaction mixture comprising all remaining reagents necessary for amplification is injected into a microfluidic device of the present invention, with the final admixing of the primers and probe with the reaction mix occurring in the reaction chamber. Again, detection of the specific amplified product may be performed as thermal cycling is occurring, or both.

"Fluid communication"—Two or more elements of a microfluidic device (for example a flow channel, injection port, exit port, via, reaction chamber, inlet or other space defined by a boundary) are in fluid communication if there exists a continuous path connecting the two that does not leave the fluid. Fluid communication may be mediated by a barrier, valve, pump or other control device to allow for controlled interruption of the fluid communication and isolate one or more elements of the microfluidic device. Fluid communication between two or more elements having within them a first fluid of a first phase may also be mediated by an immiscible fluid of a second phase. When the immiscible fluid is introduced into one of the elements, displacing the first fluid. As an example, in an emulsion, fluid communication of droplets of a dispersed phase is interrupted or prevented by the continuous phase of the emulsion.

In some embodiments of the present invention, an immiscible fluid may be the barrier or valve (a "fluid barrier" or "fluid valve") that mediates or prevents fluid communication between droplets in the reaction chambers of the microfluidic device of the present invention.

Without wishing to be bound by theory, the methods provided herein exploit the surface tension between a first fluid, one or more channel walls or reaction chamber walls and a second fluid that is immiscible with the first fluid, to create a regular array of micro-scale droplets whose position and size are precisely defined by the structure of the microfluidic channel.

An emulsion is formed when two immiscible fluids are combined and one fluid (a dispersed phase) is suspended in the other (a continuous phase) as droplets or colloids. The continuous phase forms a barrier between droplets, and if the emulsion is stabilized (coalescing of the droplets is prevented) each of the droplets may be an isolated reaction vessel. Use of a surfactant is one way to stabilize an emulsion. Another is to exploit the surface tension between the dispersed phase, one or more channel or reaction chamber walls, and continuous phase, in combination with a chambered microfluidic device that allows for a regular array of microscale droplets whose position and size are precisely defined by the structure of the microfluidic device, and thus are not allowed to come into contact.

The architecture of a microfluidic device according to some embodiments of the invention comprises a linear array of microfluidic channels that are connected to a series of nanoliter (nL), picoliter (pL) or femtoliter (fL) volume chambers through access channels. The first fluid, for example an assay mixture comprising all required components for PCR amplification is first introduced into the flow channels under pressure, causing it to dead-end fill all the reaction chambers. Ambient air is forced into the bulk of the gas-permeable elastomer device and out of the reaction chamber. Template molecules loaded at limiting dilution are randomly distributed through the array of chambers according to Poisson statistics. Once the chambers are filled, the second fluid is injected through the flow channels to displace the first fluid. Without wishing to be bound by theory, the advance of the phase interface past each chamber creates a surface tension-driven instability at the channel constriction, resulting in the separation of a droplet of aqueous solution whose position and volume is precisely defined by the geometry of the chamber. These aqueous droplets remain confined to the large cross-section of the chambers due to surface tension, allowing for precise localization of each drop during thermocycling.

Multilayer soft lithography (MSL) is a well-known fabrication technique in soft elastomer processing that allows for facile and robust fabrication of microfluidic devices having hundreds to thousands of microscopic reaction chambers, valves, pumps, fluidic logic elements and other components. Xia & Whitesides, 1998 (Angewandte Chemie-International Edition 37:551-575; herein incorporated by reference) describe and review procedures, material and techniques for soft lithography, including MSL.

Briefly, the general idea of multilayer soft lithography (MSL) is to iteratively stack layers of elastomers, for example PDMS, of varying thickness on top of each other. Thin and thick layers of PDMS with stoichiometric ratios respectively less and higher than 10:1 are formed on separate wafers. Photoresist patterns previously made on the wafers will define the microfluidic channels of the device. The thick layer is then peeled away from the wafer and placed on top of the thin wafer. After baking, the excess components in each layer will bond and form a PDMS 'chip' composed of two layers of channels. Methods of working with elastomers and applying them in microfluidic applications are known in the art; see, for example, U.S. Pat. No. 6,929,030; Scherer et al. *Science* 2000, 290, 1536-1539; Unger et al. *Science* 2000, 288, 113-116; McDonald et al. *Acc. Chem. Res.* 2002, 35, 491-499; Thorsen, T. et al., *Science* 2002, 298, 580-584; Liu, J. et al. *Anal. Chem.* 2003, 75, 4718-4723; Rolland et al. 2004 JACS 126:2322-2323, PCT publications WO 02/43615 and WO 01/01025.

Various soft polymers, generally referred to as elastomers may be used in microfluidic devices and systems. Elastomers may be generally characterized by a wide range of thermal stability, high lubricity, water repellence and physiological inertness. Other desirable characteristics of elastomers may vary with the application. It is within the ability of one of skill in the art to select a suitable elastomer or combination of elastomers for the desired purpose. Examples of elastomers include silicone, polydimethylsiloxane (PDMS), photocurable perfluoropolyethers (PFPEs), fluorosilicones, polyisoprene, polybutadiene, polychloroprene, polyisobutylene, polyurethanes, poly(styrene-butadiene-styrene), vinyl-silane crosslinked silicones, and the like. Elastomers may be optically clear, or may be opaque, or have varying degrees of transparency. In some embodiments of the invention, it may be desirable to use a biocompatible elastomer. PDMS is one of the first developed and more widely used elastomers in soft lithography applications. Where PDMS is described as the elastomer used in various embodiments of the invention, it is for exemplary purposes only, and the choice of alternate elastomers is within the knowledge of one skilled in the art. A variety of elastomers suitable for use in microfluidic applications, and their various properties and examples of applications are described in U.S. Pat. No. 6,929,030.

Photoresist patterns laid out on a silicon wafer or other suitable support provide a mold for casting the layers. Generally, photoresists may be categorized as positive or negative. Positive photoresist are capable of very fine resolutions. They are highly soluble in alkaline solutions such as KOH; however, photosensitive dissolution inhibitors such as diazonaphthaquinone (DQ) are typically used to block this effect. A photoreaction with ultraviolet (UV) light destroys the DQ and allows the photoresist to be dissolved by the developer solution. The idea of processing this type of photoresist is that all sections exposed to UV light will be removed. An example of a positive photoresist is SPR220-7 (Shipley Company LLC).

Negative photoresist generally comprises a non-photosensitive substrate, a photosensitive cross-linking agent, and a coating solvent. Upon exposure to UV light, the cross-linking agent is activated and causes a hard epoxy to form. The remaining unexposed sections of the photoresist are washed away with the developer solution. SU8 (MicroChem) is an example of a negative photoresist that may be used in both MSL molds. In addition, SU8 as an epoxy is very strong and can resist subsequent photolithography processes. Detailed methods and techniques for working with particular photoresists are available from the various manufacturers, and are not addressed further herein. Examples of particular photoresists are for illustrative purposes only, and are not to be considered as limiting of the present invention.

Other components may be incorporated into the microfluidic device during fabrication—micron-scale valves, pumps, channels, fluidic multiplexers, perfusion chambers and the like may be integrated during MSL. Methods of making and integrating such components are described in, for example, U.S. Pat. Nos. 7,144,616, 7,113,910, 7,040,338, 6,929,030, 6,899,137, 6,408,878, 6,793,753, 6,540,895; US Patent Applications 2004/0224380, 2004/0112442; PCT Applications WO 2006/060748.

Evaporation is an obstacle to be overcome when performing assays in picoliter volume ranges. During the fabrication of a microfluidic device, a vapor barrier may be incorporated into the device in proximity to the reaction chambers and channels where fluid will be placed or conveyed, and fluid loss is not desired. A vapor barrier may comprise any suitable material. A suitable material is, preferably, optically transparent, impermeable to water vapor, unreactive with the substrate comprising the microfluidics device and fluids used in the assay mixture or immiscible oil or fluid used to displace the assay mixture in the flow channels, and able to tolerate the temperature ranges used in fabricating the microfluidic array and in the assays where they are used. In addition it is desirable to use materials that may be bonded to the elastomer used. Good bonding may be a property of the elastomer or may be achieved through the application of one or more adhesive layers or through modification of the material surface (for example, by exposure to an oxygen plasma). An example of a suitable material is an acetate, polyethylene, or polyethylene-based sheet, polyxylylene polymers (Parylene™ N, C, D) others include glass, silicon, quartz, mica. As well, other polymeric material may be used, these polymeric materials may be deposited as a prefabricated film or by using other polymer processing techniques such as depositing a liquid that will set as a film (examples include resin formulations, polymeric solutions, precursor mixes, etc), or by vapor deposition of a polymer (such as Parylene), or by evaporation where the material condenses on the surface, or by spraying of an aerosol, or the like.

The vapor barrier is applied or positioned during fabrication of the microfluidic device coplanar with at least one side of the array. The vapor barrier is separated from one wall of the reaction chambers of the array by a layer of elastomer of sufficient thickness to absorb gas forced into the elastomer by dead-end filling. This thickness may be, for example, from about 10 to about 500 µm, or from about 50 to about 250 µm, or from about 75 to about 225 µm, or from about 100 to about 200 µm, or from about 125 to about 175 µm. Without wishing to be bound by theory, this geometry provides for establishment of a substantially-two dimensional gradient of water vapor so that transport (evaporation) occurs only through the sides of the array.

In a preferred example, the array is flanked on both planar sides by a vapor barrier. In some embodiments of the invention, a microfluidic array is positioned between a silicon substrate (the bottom of the array) and an acetate or polyethylene sheet on top of the array, separated from For a device employing two vapor barriers configured as described, the barriers may be separated by any suitable distance, which will vary depending on the height of the reaction chambers and the presence of any additional layers of flow channels, valves, etc positioned above or below the array of reaction chambers.

A simple, schematic representation of a fabrication process is illustrated in FIG. 1. (A) Mold features 120 is cast on a wafer 121, using standard soft lithographic techniques. (B) Liquid PDMS is spun on top of the wafer and partially hardened, so that its thickness is slightly higher than the height of the features. (C) A vapour barrier 123 is applied on top of the PDMS layer 122, and covered by a second layer 124 of PDMS. (D) Following de-gassing and baking, the device is peeled away from the mold, leaving a negative imprint on the cured PDMS.

Figure 2A:
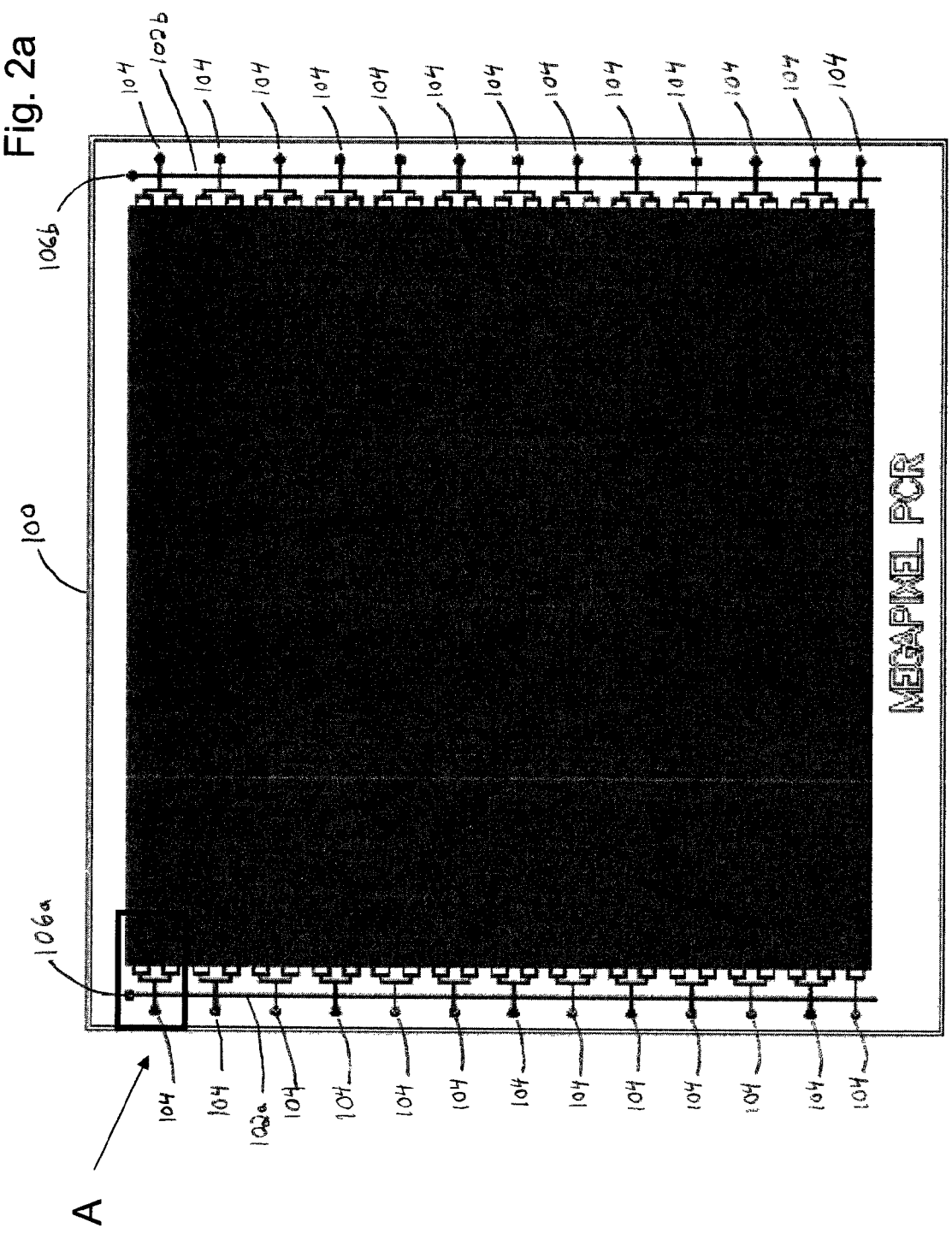
FIG. 2 shows a schematic of a microfluidic array according to an embodiment of the invention. (a) A microfluidic array featuring 1,000,000 reaction chambers in an area of 1"×1" (2.54 cm×2.54 cm). (b) Inset of A showing a sample loading region. (c) Inset of B showing microfabricated reaction chambers and feed channels. (d) Three dimensional rendering of reaction chamber geometry. In this example, the chamber is 10 microns per side at the base and 40 microns high for a total volume of 4 picoliters (pL). (e) A microfluidic array as in (a), lacking valve channels. (f) Inset of D. (g) A microfluidic array as in A, lacking valve channels and comprising a hydration channel.
Figure 2D:
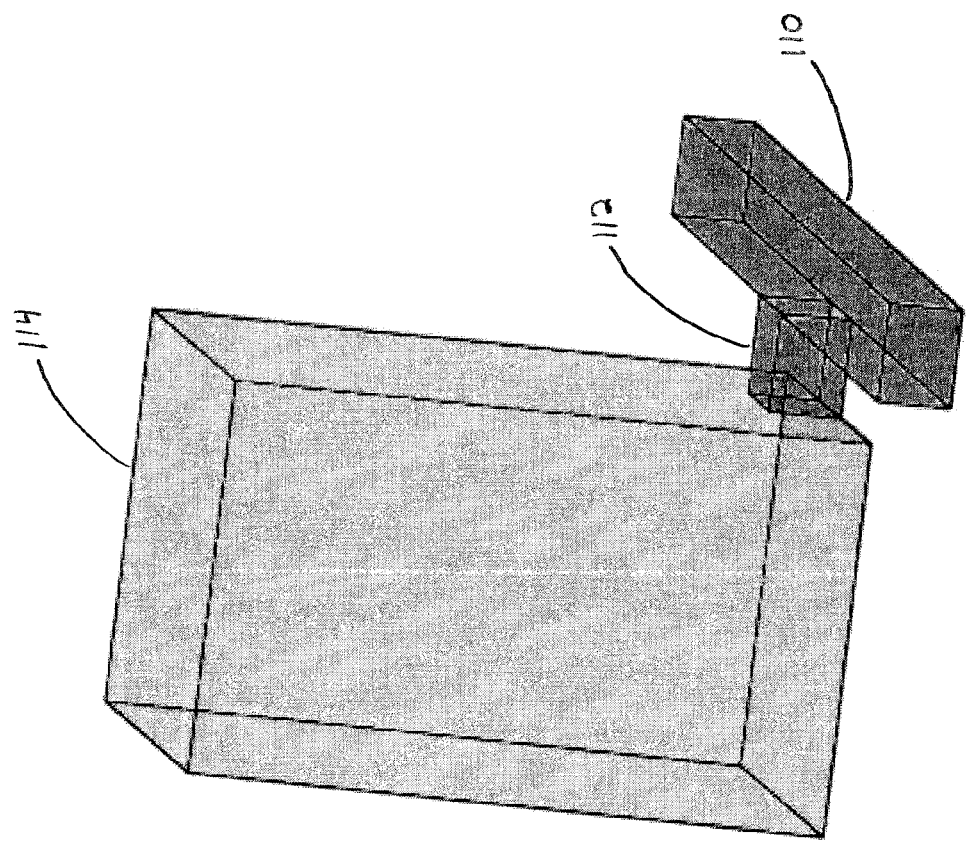

Referring to FIGS. 2a-d, a schematic diagram of device according to one embodiment of the invention is illustrated generally at 100. FIG. 2b shows inset A of FIG. 2a; FIG. 2c shows inset B of FIG. 2d; FIG. 2d shows a three dimensional rendering of a reaction chamber 114, indicated at inset C of FIG. 2c. This exemplary device comprises 13 primary flow channels 103 in fluid communication with a cascading series of flow channels 105, 107, 109 for loading reaction chambers 114. Each primary flow channel services a sub-array and may be loaded with a fluid comprising a reaction mixture, sample or the like, and may be independent of flow channels, thus enabling more than one sample, or more than one reaction on the same sample to be loaded and processed on the same device.

Valve flow channels 102a, 102b intersect the primary flow channel 103, flanking the array of reaction chambers. Flow of fluid from injection port 104 is regulated by valve 108; valve 108 is opened or closed by fluid pressure in valve flow channel 102a, b. All valves along valve flow channel 102a may be operated simultaneously by injection port 106a; all valves along valve flow channel 102b may be operated simultaneously by injection port 106b. Reaction chamber 114 is in fluid communication with reaction chamber flow channel 110 via reaction chamber access channel 112. In the embodiment illustrated in FIGS. 2c and 2d, reaction chamber 114 is a blind chamber, having a single filling port and no separate exit port. Reaction chamber 114 as exemplified in FIG. 2d is taller than it is wide, with the access flow channel at the bottom of the reaction chamber. Other configurations of reaction chambers are possible. For example, reaction chamber such as that shown in FIG. 2d, may have a small 'footprint' area (width× length) and taller than it is wide or long. Such a 'vertical' configuration may provide for a larger sample volume and maximize the planar density of the chambers. A larger reaction volume may allow for inclusion of a greater quantity of fluorophore (or other detectable label or signal producing reagent) in a reaction chamber, thus a stronger signal for detection).

Referring to FIGS. 2e and 2f, a schematic diagram of an alternate embodiment of the present invention, lacking valve channels 102a, b, valves 108 and valve flow channel inlets 106a, b is shown generally at 130. FIG. 2f shows inset D of FIG. 2e; the inset B of FIG. 2f is as illustrated in FIG. 2c. Flow channels 103, 105, 107, 109 for loading reaction chambers 114 are as previously addressed.

Figure 2G:
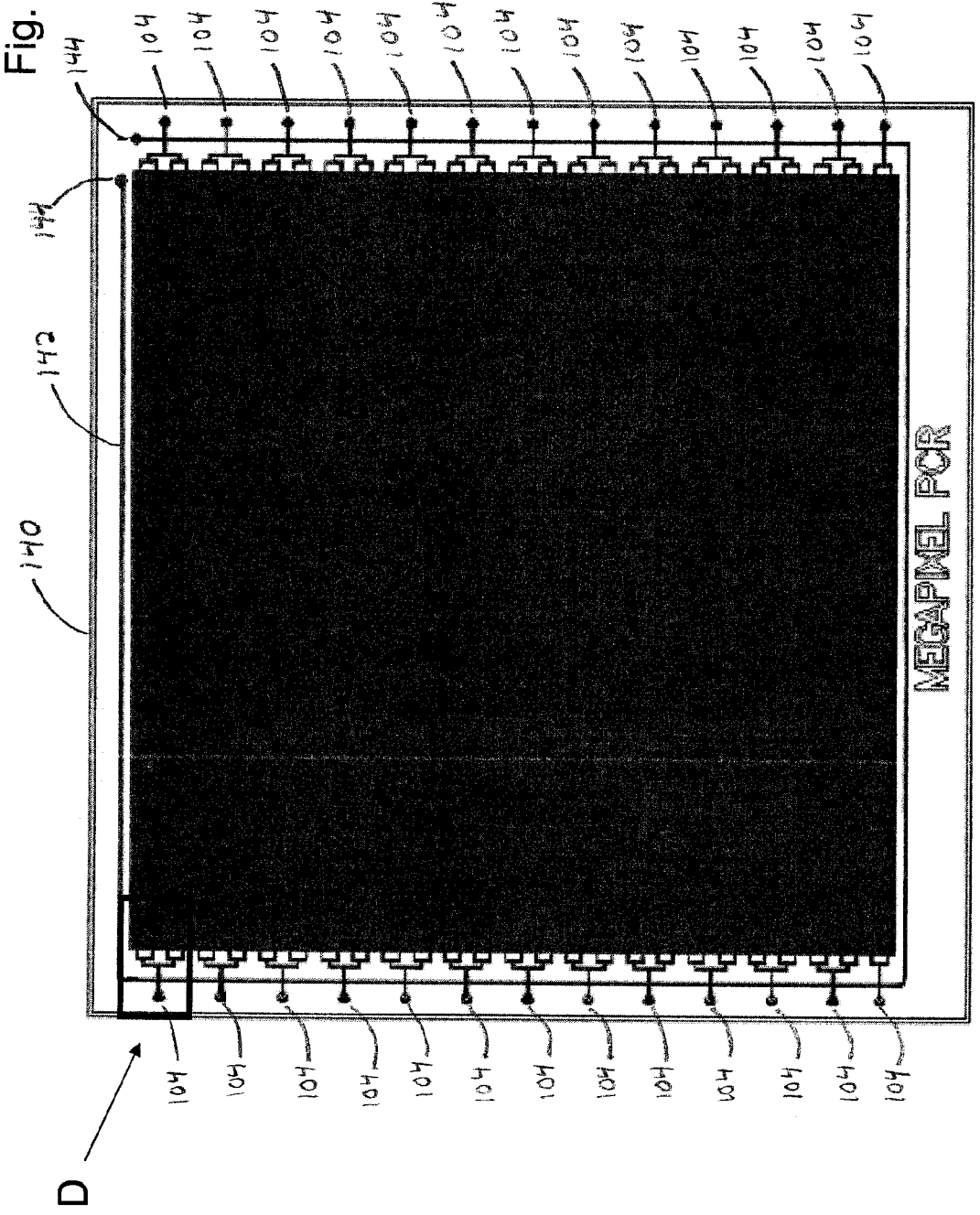

Hydration channels filled and operated separately from the valve flow channels and primary fluid channels may be included around the periphery of the array to hydrate reaction chambers near the edge of the array. Referring to FIG. 2g, a schematic diagram of an alternate embodiment of the present invention is shown generally at 140. This embodiment comprises injection ports 104 and flow channels as illustrated in FIGS. 2a-d and e-f, and further comprises hydration channel 142 and ports 144. Hydration channel 142 is formed in a layer above or below the primary flow channel 103 and separated from flow channels and reaction chambers, including primary flow channel 103, by a sufficient thickness of elastomer so that fluid flow and pressure in the hydration channel does substantially restrict fluid flow in primary flow channel 103, or flow channels 105, 107 or 109 (not shown). The term "substantially restrict" (or similar terms) is to be taken to indicate that the fluid flow is not reduced in, our or through the flow channel or reaction chamber by more than 40%, typically less than 30%, preferably less than 20% or more preferably less than 10%, as compared to fluid flow in, to or through the flow channel or reaction site under the conditions when the hydration channel does not contain a fluid, or is under pressure. Hydration channel 142 may have an internal diameter about the same as that of flow channel 103, 105, 107 or 109.

One of skill in the relevant art will appreciate that the various features disclosed herein may be combined in some embodiments of the invention. For example, a microfluidic device may comprise a valve flow channel as illustrated in FIGS. 2a and b, as well as a hydration channel. Other configurations of the hydration channel are also contemplated; for example, a series of separate hydration channels may be positioned along an edge of the microfluidic device.

Devices according to some embodiments of the present invention may be fabricated to comprise a plurality of separate injection ports that each interface with a separate section or sub-array—the high density of the array allows for multi-sample analysis using spatial multiplexing on a single device. For example, an array of approximately 1,000,000 reactions may be divided into 40 independent sections, each comprised of approximately 25,000 reaction chambers. A separate injection port for interfacing with each independent sub-array allows for implementation of multi-sample analysis.

A preloading strategy may be employed to spatially multiplex separate assays within defined regions of the array. Briefly, one or more valves may be used to isolate sections of the array into which distinct reagent sets (for example, distinct primer and/or probe sets) in solution may be dead-end loaded. Flow channels may be subsequently flushed with air to remove excess reagent, and the device incubated at about 80° C. to evaporate water from the reaction mixes, leaving dried primers and probes in defined sections of the array. Using such a preloaded device, a sample comprising a target nucleic acid in solution may be introduced to all reaction chambers of the array and analyzed for a plurality of target nucleic acids (for example, for an array having 40 independent sections, up to 40 separate target nucleic acids may be analyzed).

In the device exemplified in FIG. 2a-d, valve flow channels provide for valves positioned at the edges of the device. As illustrated in FIGS. 2e-g, a valveless embodiment of a microfluidic device may also be employed. In such embodiments, fluid flow in, out and through flow channels or hydration channels may be controlled by valves external to the microfluidic device.

To load the reaction chambers with a reaction mixture (a first fluid), the reaction chambers (114) are dead-end filled with a first fluid ($F_1$, FIG. 3) injected through injection port 104. All reaction chambers are thus in fluid communication with the flow channel via the reaction chamber access channel. Subsequently, a second fluid ($F_2$) is injected into the injection port—$F_2$ displaces $F_1$ as it flows through the flow channels.

The first fluid may be an aqueous solution, such as a reaction mixture for use in an assay. As an example, for a polymerase chain reaction (PCR) assay, the first fluid may comprise all of the reagents necessary for PCR—template nucleic acid, nucleotides, primers a suitable nucleic acid polymerase, buffer, salts. Depending on the intended use of the assay, the first fluid may further comprise a dye, a label, a probe or other reagents for detecting the product of the PCR assay. The second fluid is immiscible with the first fluid, and is also compatible with the material the microfluidic device is constructed from. The second fluid may be an oil, for example a fluorinated oil, that is compatible with the PDMS elastomer from which the device is fabricated. By 'compatible' it is meant that the second fluid does not interact or react with the device in an undesirable manner—for example, the elastomer does not absorb the fluid or swell when exposed to the fluid, and the physical properties of the device are unaltered (no substantive change in elasticity or rigidity). Examples of second fluids that may be used with a microfluidic device comprising PDMS include perfluorohexane (Fluorinert™), fluorinated silicone oils, fluorinated oils (for example, FC40, FC43, FC70, FC-72, FC-77, FC-84, FC-87 or the like, available from 3M or other suppliers) and high molecular weight oils such as paraffin oil.

The specific dimension and density of the reaction chamber and other features of a microfluidics device according to the present invention may be constrained only by the limitations of the multilayer soft lithography (MSL) methods themselves. Current MSL techniques are routinely capable of fabricating features as small as 1 µm. For example, a microfluidic device of the present invention may comprise an array of reaction chambers numbering from about 50,000 to about $10^8$ or any amount therebetween; or from about 100,000 to about $5 \times 10^6$ or any amount therebetween; or from about 200,000 to about $2 \times 10^6$ or any amount therebetween; or from about 250,000 to about $10^6$ or any amount therebetween, depending on the overall size of the device.

The density of reaction chambers may be expressed in terms of the quantity per unit area. For example some devices may have a density of reaction chambers from about 1000 to about $2 \times 10^6$ per square centimeter, or any amount therebetween; from about 5000 to about $10^6$ per square centimeter or any amount therebetween; from about 10000 to about 500,000 or any amount therebetween. For example, the density of reaction chambers may be about 1000, 2000, 3000, 4000, 5000, 6000, 7000, 8000, 9000, 10000, 15000, 20000, 25000, 30000, 35000, 40000, 45000, 50000, 100,000, 150,000, 200,000, 250,000, 300,000, 350000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,000, 1,300,000, 1,350,000, 1,400,000, 1,450,000, 1,500,000, 1,550,000, 1,600,000, 1,650,000, 1,700,000, 1,750,000, 1,800,000, 1,850,000, 1,900,000, 1,950,000, 2,000,000 per square centimeter.

The density at which reaction chambers may be placed in the microfluidic array may vary also. As an example, an array of 5 µm³ reaction chambers with a pitch of about 10 µm would represent a total density of $10^6$ reaction chambers per square centimeter (about 125 fL per chamber). The pitch of the chambers will vary with the intended use of the device; greater separation may be necessary for reactions that require a greater volume (for example, if a whole cell is to be placed in the reaction chamber, or if the target molecules cannot be sufficiently concentrated with convenient methods). For some microfluidic arrays, the pitch may have to be determined empirically—determination of the optimal pitch is within the ability of one skilled in the art. As an example, the pitch may be from about 1 to about 1000 µm, or any amount therebetween, from about 2 to about 80 µm or any amount therebetween, from 5 to about 60 µm or any amount therebetween, from about 10 to about 40 µm or any amount therebetween, or from about 20 to about 50 µm or any amount therebetween. For example, the pitch may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95 or 100 µm.

Compartmentalization of a single particle within a droplet of a small volume allows for the effective concentration of this particle, cell, or molecule to be high. One method of compartmentalization is use of an emulsion where aqueous droplets are separated on at least one side by a second liquid phase such as oil. Microfluidic devices comprising fluid channels with defined microchambers (reaction chambers) according to some embodiments of the invention allow for a planar (2-dimensional emulsion) to be formed with a regular spatial arrangement—valves are not required to define the reaction chambers, thus the limits they may impose on pitch and density of reaction chambers in an array of reaction chambers is removed. This concentration enhancement, when combined with amplification methods, allows for the enumeration of single molecules—digital quantification. Without wishing to be bound by theory, the enhancement of concentration of biological matter through such compartmentalization provides a means by which to increase detection and assay sensitivity. The concentration of the particle may be expressed relative to the average number per well of an array. For example, in an array of reaction chambers where each well has a an average of 1 particle, some reaction chambers may contain zero, some may contain one, and some may contain two or more particles. As another example, in an array of reaction chambers where each well has an average of 0.1 particles, most reaction chambers would be expected to have zero particles, about 10% would be expected to have one particle, and a very few may have two or more particles. According to some embodiments of the invention, the particle may be provided at an average concentration per reaction chamber of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, or any amount therebetween.

A particle may be any discrete material which can be flowed through a microscale system. Example particles include beads, nucleic acids, target nucleic acids, proteins, biological cells, molecules and the like. For example, polymer beads (e.g., polystyrene, polypropylene, latex, nylon and many others), silica or silicon beads, clay or clay beads, ceramic beads, glass beads, magnetic beads, metallic beads, inorganic compound beads, and organic compound beads can be used. An enormous variety of particles are commercially available, e.g., those typically used for chromatography (see, e.g., the 1999 Sigma "Biochemicals and Reagents for Life Sciences Research" Catalog from Sigma (Saint Louis, Mo.), e.g., pp. 1921-2007; The 1999 Suppleco "Chromatography Products" Catalogue, and others), as well as those commonly used for affinity purification (e.g., Dynabeads™ from Dynal, as well as many derivitized beads, e.g., various derivitized Dynabeads™ (e.g., the various magnetic Dynabeads™, which commonly include coupled reagents) supplied e.g., by Promega, the Baxter Immunotherapy Group, and many other sources).

For example, the compartmentalization of 1 microliter volume of solution containing a single DNA molecule has a concentration of $10^6 \, L^{-1}$. The compartmentalization of this solution into 1,000,000 droplets each with a volume of 1 picoliter results in 999,999 droplets with a concentration of 0, and 1 droplet with an effective concentration of $10^{12} \, L^{-1}$—an enhancement of 1,000,000 times. In another example, microfluidic devices of the present invention may be employed to compartmentalize a cell within a reaction chamber (for example a volume of about 100 pL). Isolation of a single cell allows for the cell to exert a large influence on its environment, and to secrete molecules to be concentrated sufficiently for detection.

Picoliter (pL) volume droplets have large surface to volume ratios—reliable amplification of single molecules may be challenged by reagent evaporation during thermocycling, a phenomena that is particularly acute in devices made from PDMS which is known to have very high vapor permeability. This evaporation may be pronounced in planar emulsion arrays where significant gradients occur in the direction normal to the plane. To control this evaporation, a vapor barrier may be embedded in the device, and flanking the array. Vapor loss in a gradient normal to the plane of the array is thereby eliminated, allowing for successful amplification of target nucleic acid in pL volume reactions. A "picoliter volume" describes generally a small volume of about 1 to about 1000 pL, or any amount therebetween; from about 1 to about 500 pL, or any amount therebetween; from about 1 to about 200 pL or any amount therebetween; from about 1 to about 100 pL, or any amount therebetween; or from about 1 to about 50 pL, or any amount therebetween. For example, the volume of the reaction mixture formed by the microfluidic devices of the present invention, or the volume of reaction mixture used in methods of the present invention may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 400, 450, 500, 550, 600, 650, 700, 750, 800, 850, 900, 950, or 1000 pL.

Sub-picoliter reaction volumes are also practical and useful according to the various embodiments of the invention. As discussed, conventional lithographic fabrication techniques can achieve features as small as 1 um and are thus capable of defining chambers with volumes in the femtoliter to picoliter scale. For example, a 1 $\mu m^3$ chamber in a microfluidic array would have a volume of about 1 femtoliter (fL); a chamber of about 5 $\mu m^3$ would have a volume of about 125 fL. A sub-picoliter volume describes generally a small volume of about 1 to about 1000 fL, or any amount therebetween; from about 10 to about 500 fL, or any amount therebetween; or from about 100 to about 500 fL or any amount therebetween. For example, the volume of the reaction mixture formed by the microfluidic devices of the present invention, or the volume of reaction mixture used in methods of the present invention may be about 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 250, 300, 350, 400, 450, 500, 550, 600, 650, 700, 750, 800, 850, 900, 950, or 1000 fL.

The reaction chambers may alternately be described by their volume in cubic micrometers, or similar dimensions, rather than by the droplet volume. It will be within the ability of one skilled in the art to determine the necessary conversion between units, for example from cubic micrometers to picoliters, or the like.

In addition to limiting or preventing evaporation of the reaction mix in the reaction chamber, the reaction conditions are controlled.

If the device is to be utilized in temperature controlled reactions (for example, incubating at one or more temperatures for a period of time, either as a single incubation or a series of cyclical temperatures, for example thermocycling as employed in PCR or other amplification or extension reactions), the elastomeric device may be fixed to a support, such as a glass slide or silicon wafer. The device may be placed in a temperature and/or environment controlled incubator, or for a thermocycling reaction, the device may be placed on any number of thermocycling plates. Devices for thermal cycling are known and available. Generally, a microfluidic device comprising an array of reaction chambers may be placed on a thermal cycling plate to effect the thermal cycling of the reaction. A variety of such thermal cycling plates are available from commercial sources, for example, BioRad, Thermo, Eppendorf, Techne, Applied Biosystems, and others. Alternatively, the substrate of the device may contain active heating and temperature sensing elements to provide the necessary thermocycling conditions. The fabrication of heaters and temperature sensors in a silicon substrate for instance is well-known in the art.

For PCR, thermocycling requires precise control of both temperature and the time at which the reaction is incubated at a particular temperature. The temperature ranges for denaturation, annealing and extension of the template or target nucleic acid vary depending on the particular amplification reaction performed, complementarity of the primers employed, the composition of the target nucleic acid and the particular polymerase selected. Other amplification methods may not necessitate multiple rounds of thermal cycling, but may still benefit from thermal and temporal control of reaction conditions. For example, various isothermal nucleic acid amplification strategies such as rolling circle amplification are known and are envisioned with the present invention.

The ability to monitor the thermal profile of the device and reaction chambers may also be useful. Sensors may be incorporated into the microfluidic device (e.g. a thermocouple, or a thermistor, or a pyroelectric sensor. Temperature may be monitored by use of an infrared camera, or by use of thermochromic materials. These and other methods for monitoring temperature profiles within a microfluidic device are described in U.S. Pat. No. 7,118,910.

Applications of the microfluidic devices and methods according to some embodiments of the invention are numerous and varied. Uses or applications, and methods comprising uses or applications of the microfluidic devices and methods described herein are not limited to any particular application or use thereof. In some embodiments of the invention, the following uses and applications are contemplated.

Samples, Assays and Assay Conditions

A myriad of assays and uses exist to which microfluidic devices according to some embodiments of the present invention may be applied. A review of such uses, and references and disclosures of methods and protocols is provided in PCT Publication WO 00/50172. Selected assays are exemplified herein for illustrative purposes, and are not to be considered limiting.

Single-cell assays—Microfluidic-based single cell analyses may be used for a variety of purposes, for example cell sorting, nucleic acid purification and amplification, patch-clamping, calcium flux measurements, and whole cell electrophoresis. Additionally, the capture and imaging of one or a few single cells in microfabricated devices may be used to monitor cellular response to varying concentrations of one or a few chemical stimuli.

A microfluidic device, or a system comprising such a device, may provide cell-handling capabilities for sorting and capturing a subpopulation of cells in a format which allows for subsequent stimulation and analysis. Such a system may allow for selection of a single cell from a population, the capture of this cell at any position within an addressable array of chambers, the application of one or more reaction conditions, and imaging of each reaction chamber. This functionality may provide an instrument for chemical genetics studies of a plurality of single cells. Examples of cell-based microfluidic assays are described in, for example PCT Publication WO 98/00231 and WO 98/45481. Cell-based microfluidic assays may be useful for screening of binding and/or internalization of cell ligands, for example, receptor ligands, drugs, cofactors and the like.

Particles within a microfluidic array according to some embodiments of the invention may present a solid or semi-solid surface for any of a variety of linking chemistries, allowing the incorporation of biological and chemical components of interest into the particle members of the arrays. A wide variety of organic and inorganic polymers, both natural and synthetic may be employed as the material for the solid surface. Illustrative polymers include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, nitrocellulose, and the like. A wide variety of linking chemistries are available for linking molecules to a wide variety of solid or semi-solid particle support elements. One of skill in the relevant art will be aware of and may easily select appropriate chemistries, depending on the intended application.

Protein structural studies—A microfluidic device according to some embodiments of the invention may be useful for structural biology applications, for example protein crystallography. Methods and techniques useful for such applications are described in, for example Hansen & Quake, 2003. Current Opinion in Structural Biology 113:538-544; Hansen et al, 2006. J Am Chem Soc. 128:3142-3143; U.S. Pat. No. 7,217,321.

The microfluidic devices according to some embodiments of the invention may be adapted for uses comprising screening other biological components as well, including cells, antibodies, antibody ligands, proteins, peptides, and the like. The presence or absence of such cells, antibodies and antibody ligands are also known to correlate with desirable or undesirable features. A limiting dilution of a sample comprising may be applied to the microfluidic device and flowed into the reaction chambers, and the chambers isolated by a fluid barrier as described. Prior to application, the sample may be combined with a marker such as a labeled antibody (e.g. with a fluorescent tag) or similar marker. Following isolation, the individual chambers may be interrogated for the presence or absence of the biological component, by screening for the presence of the marker. Examples of screening assays, immunoassays, protein identification assays and the like are described in, for example U.S. Pat. No. 6,632,655.

Sequencing, identification of polymorphisms—A microfluidic device according to some embodiments of the invention may be used for nucleic acid sequencing, particularly generation of sequencing libraries. The DNA to be sequenced (target nucleic acid) is provided with a polymerase and a primer and other necessary reagents, and is then exposed to one type of DNA base (A, C, T, or G) at a time in order to rapidly assay for base incorporation. A variety of techniques for determining the sequence of a nucleotide or nucleotides are described infra. In some embodiments of the invention, the microfluidic device of the invention may be used for sequencing nucleic acids. The devices of the invention optionally include reagents (which may be part of the array or flowed into contact with the array, e.g. in a reagent train) for performing a biological or chemical assay. The reaction mix for sequencing may comprise some or all of nucleotides, polymerases, dNTP, ddNTP, dNTP analogues, fluorescent dNTP, or a fluorescent dNTP, inorganic phosphate, ATP, a thermostable polymerase, an endonuclease, an exonuclease, a phosphatase, an intercalating dye, a labeled probe, a reducing agent, $Mg^{++}$, a molecular crowding agent, e.g., PEG, a buffer, a salt, DTT, BSA, a detergent or surfactant, chemicals to inhibit or enhance electroosmotic flow (e.g., polyacrylamide) or the like.

Other methods of analysis of target nucleic acids are described infra.

A target nucleic acid is a nucleic acid comprising one or more sequences of interest. The presence of a target nucleic acid in a sample or reaction mixture may be detected, and depending on the assay design, may also be quantified. A target nucleic acid may be obtained from a biological sample (a "sample").

A "polymorphism" is the occurrence of two or more forms of a target nucleic acid in a population. Polymorphic sites may be at known positions within a nucleic acid sequence or may be determined to exist in a target nucleic acid using the methods described herein. A polymorphism may be alternately described as a sequence variation or sequence variant; if occurring in DNA, a 'DNA sequence variation'; if occurring in RNA, an 'RNA sequence variation'. A single nucleotide polymorphism, or SNP, is a polymorphism consisting of a single base change.

Tissue samples may be obtained by, for example, curettage, needle aspiration biopsy or needle (core) biopsy, incisional biopsy for sampling tissue, or excisional biopsy, which may entail total removal of the tissue of interest. Alternatively, other bodily samples that contain genetic material, may be used, for example hair, blood, plasma, serum, sputum, urine, stool, semen, amniotic fluid, chorionic villi or other fetal or embryonic tissue using methods known in the art.

DNA and RNA may be isolated from a biological sample, either separately or together, by any of a variety of methods known in the art. Choice of the method may depend on the nucleic acid to be assayed (DNA or RNA), the method used to assay, and the like Methods for the isolation of DNA and RNA from biological samples are known in the art, for example Sambrook J. et al. "Molecular Cloning", Cold Spring Harbor Laboratory Press (1989) and Ausubel, F M. et al., "Current Protocols in Molecular Biology", John Wiley & Sons, Inc. (1994), Botwell, D D L. Anal. Biochem. (1987) 162:463-465); U.S. Pat. No. 5,130,423; U.S. Pat. No. 5,945,515; U.S. Pat. No. 5,989,431; U.S. Pat. No. 5,128,247. In some cases, such as analysis of single cells, it may not be necessary to purify DNA or RNA prior to analysis Specific sequences of a target nucleic acid in a sample may be amplified by any of several methods, known in the art, for example Touchdown PCR, Reverse Transcription Polymerase Chain Reaction (RT-PCR), Polymerase Chain Reaction (PCR), Inverse PCR, Transcription Mediated Amplification (TMA), Nested PCR, Ligase chain reaction (LCR), Nucleic Acid Sequence Based Amplification (NASBA) and the like. See, for example, Compton J. 1991. Nature. 350:91-92; Malek et al., 1994. Methods Mol Biol 28:253-60; Innis et al. (eds.) PCR Protocols: A Guide to Methods and Applications, pp. 60-66, San Diego, Calif., Academic Press, Inc., 1990; Roux K., 1994. Biotechniques 16:812-4; Hecker K and Roux, L., 1996; Biotechniques 20:478-85; Ochman et al., 1988. Genetics 120:621-3; U.S. Pat. No. 5,299,491. Selection of these parameters, methodologies and reagents, and methods of optimizing them for particular reaction conditions is within the ability of one skilled in the art.

The high density reaction chamber arrays of the microfluidic devices of the present invention also allows analysis of multiple target nucleic acids, or multiple samples, or both, on a single device. For example, an array of 1,000,000 reactions can be divided into 40 independent sections each comprised of 25,000 digital PCR chambers. Inclusion of separate injection ports that interface with independent sub-arrays allow for implementation of multi-sample analysis. In another example, a preloading strategy may be employed to spatially multiplex separate assays within defined regions of the array. Microvalves may be used to isolate sections of the array into which distinct primer and probe sets may be dead-end loaded as described. Flow channels may be subsequently be flushed with air to remove excess assay mix and the preloaded devices incubated (e.g. at about 70-80° C.) to dehydrate the reagents in the preloaded assay mixes, leaving dried primers and probes in defined section. Following this dehydration step, a reaction mix comprising one or more target nucleic acids and other reagents necessary for PCR (but not primers and probes, which have been preloaded) is injected into the one or more sub-arrays of the microfluidic device as described above, and the dehydrated reagents are rehydrated. The flow channels are subsequently flushed to isolate the reaction chambers and the reactions thermally cycled. Amplification products may be monitored during, or following the amplification reaction.

In another example, two or more amplification products may be detected and quantified in a single reaction. This may be achieved by incorporating multiple sequence-specific fluorescent probes labeled with spectrally distinct fluorophores in a reaction mix. Multiplexing in this manner increases the number of target nucleic acids that may be assayed in a single sample and has an important role in quantitative analysis of one or more target nucleic acids by enabling the normalization of results by a reference nucleic acid.

Detection of the target nucleic acid, or the product of its amplification is also useful. A variety of strategies may be used with the microfluidics devices and methods described herein; selection of an appropriate system is also dependent on the particulars of the reaction, the compatibility of the detection system and reagents with the product of the reaction conditions, the scale of the number of reactions (for example, number, density of reaction chambers), and whether the target nucleic acid, or product of its amplification is monitored during the assay, or as an endpoint. Signal types to be detected may include those from fluorophores, chromophores, chemiluminescence, colorimetric reactions, radioactivity, substrates from enzymatic reactions and the like.

Exemplary methodologies for detecting signals include confocal laser scanning microscopy, resonance energy transfer (RET), fluorescent resonance energy transfer (FRET), bioluminescent resonance energy transfer (BRET), scintillation detection, fluorescence correlation spectroscopy, light scattering, light absorption (UV or visible), reflectivity and the like.

The presence of a target nucleic acid or the product of its amplification may be determined by, for example, uptake of a dye specific for double-stranded nucleic acids, or by the hybridization of a portion of the amplified nucleic acid to a probe.

DNA-staining dyes that fluoresce only when bound to double-stranded nucleic acids may be useful for detection of amplification products. Examples of such dyes include SYBR Green I, II, SYBR Gold, YO (Oxazole Yellow), TO (Thiazole Orange), PicoGreen (PG) (available from Molecular Probes, Invitrogen), ethidium bromide, propidium iodide, Hoechst 33258, Hoechst 33342, DAPI and the like. Further discussion relating to the uses of DNA-staining dyes may be found in, for example, Glazer et al., 1997. Curr Opin Biotechnol 8:94-102; and Glazer, A N and Rye, H S. 1992. Nature 359:859-61, Higuchi et al., BioTechnology 10:413-417.

A "molecular beacon" is a single stranded oligonucleotide that, unless hybridized to a target nucleic acid, will exist in a hairpin configuration. A first end of the oligonucleotide has attached a fluorescent dye, and a second end has attached a quencher molecule. When in the hairpin configuration, the fluorescence is quenched by the proximity of the quencher molecule and no fluorescence is observed. Once the oligonucleotide 'beacon' hybridizes to the target nucleic acid, the fluorescent dye is sufficiently separated from the quencher molecule, and fluorescence is detectable. By monitoring emission changes in the dye, indirect monitoring of the amplification product is possible. Further details sufficient to guide one of skill in the art may be found in, for example, PCT Publication WO 95/13399, Tyagi S et al. 1998. Nat Biotechnol 1:49-53; Tyagi S and Kramer F R. 1996 Nat Biotechnol 3:303-8; and Marras S A et al., 1999. Genet Anal 5-6:151-6.

Fluorescence energy resonance transfer (FRET) is a distance-dependent interaction between a donor fluorophore and acceptor fluorophore pair, selected so that the emission spectrum of the donor overlaps with the excitation spectrum of the acceptor. When the fluorophores are brought within sufficient proximity, excitation of the donor fluorophore by a first defined wavelength is transferred from the donor to the acceptor, and fluorescence at a second defined wavelength may be detected. For detection of nucleic acid hybridization, a specific probe is labeled with a one member of the donor/acceptor pair, and a nucleotide is labeled with the other member of the donor/acceptor pair. When free in solution (for example, before the nucleic acid polymerization, or hybridization occurs), the donor/acceptor pair are sufficient distant to prevent the energy transfer. As the polymerization reaction proceeds, labeled nucleotides will be incorporated into the molecule sufficiently close to the labeled primer so that the energy transfer may take place, and the fluorescence detected. Examples of methods that may be used to detect polymorphisms in a target nucleic acid are described in, for example, U.S. Pat. No. 6,500,650, U.S. Pat. No. 5,945,283 U.S. Publication 2004/0005613 and WO 97/22719.

Real-time quantitative PCR may be used to determine the quantity of a target nucleic acid sequence in a sample by measuring the amount of amplification product formed during and/or after the amplification. The commercially available TaqMan™ assay (Applied Biosystems) is based on the 5' nuclease activity of Taq polymerase that displaces and cleaves the oligonucleotide probes hybridized to the target DNA generating a fluorescent signal. It is necessary to have two probes that differ at the polymorphic site wherein one probe is complementary to the 'normal' sequence and the other to the mutation of interest. These probes have different fluorescent dyes attached to the 5' end and a quencher attached to the 3' end when the probes are intact the quencher interacts with the fluorophore by fluorescence resonance energy transfer (FRET) to quench the fluorescence of the probe. During the PCR annealing step the hybridization probes hybridize to target DNA. In the extension step the 5' fluorescent dye is cleaved by the 5' nuclease activity of Taq polymerase, leading to an increase in fluorescence of the reporter dye. Mismatched probes are displaced without fragmentation. The presence of a mutation in a sample is determined by measuring the signal intensity of the two different dyes. See also U.S. Pat. Nos. 5,210,015, 5,487,972.

Invasive cleavage methods employ an oligonucleotide called an Invader™ probe and sequence-specific probes to anneal to the target DNA with an overlap of one nucleotide. When the sequence-specific probe is complementary to the polymorphic base, overlaps of the 3' end of the invader oligonucleotide form a structure that is recognized and cleaved by a Flap endonuclease releasing the 5' arm of the allele specific probe. Further details sufficient to guide one of ordinary skill in the art is provided by, for example, Neri B. et al. 2000. Advances in Nucleic Acid and Protein Analysis 3826: 117-125, U.S. Pat. No. 6,964,848.

Assays comprising the use of a Scorpion probe system may also be useful. Such probes and systems are described in, for example Nucleic Acids Research 2000 28:3752-3761 and PCT Publication WO 99/66071.

Primer extension reactions (i.e. mini sequencing, nucleotide-specific extensions, or simple PCR amplification) may also be useful in sequence discrimination reactions to identify a polymorphism in a target nucleic acid. For example, in a mini sequencing reaction, a primer anneals to its target nucleic acid (usually DNA) immediately upstream of the SNP and is extended with a single nucleotide complementary to the polymorphic site. Where the nucleotide is not complementary, no extension occurs.

Oligonucleotide ligation assays (OLA) require two sequence-specific probes and one common ligation probe per SNP. The common ligation probe hybridizes adjacent to a sequence-specific probe and when there is a perfect match of the appropriate sequence-specific probe, the ligase joins both the sequence-specific and the common probes. Where there is not a perfect match the ligase is unable to join the sequence-specific and common probes. The annealing of the probes may be detected by, for example, an enzyme immunoassay (Villahermosa M L. J Hum Virol (2001) 4(5):238-48; Romp-panen E L. Scand J Clin Lab Invest (2001) 61(2):123-9; Iannone M A. et al. Cytometry (2000) 39(2):131-40).

Ligation-Rolling Circle Amplification (L-RCA) has also been successfully used for genotyping single nucleotide polymorphisms as described in Qi X. et al. Nucleic Acids Res (2001) 29(22):E116.

Sanger sequencing (Sanger et al., 1977 PNAS 74:5463-5467) employs a DNA polymerase to synthesize sequence-dependent fragments of various lengths. The lengths of the fragments are determined by the random incorporation of dideoxynucleotide base-specific terminators. These fragments can then be separated in a gel, visualized, and the sequence determined. Numerous improvements have been made to refine the above methods and to automate the sequencing procedures. Similarly, RNA sequencing methods are also known, see, for example Zimmern D. and Kaesberg P. Proc. Natl. Acad. Sci. USA (1978) 75(9):4257-4261) and Mills D R. and Kramer F R. (Proc. Natl. Acad. Sci. USA (1979) 76(5):2232-2235) Direct chemical methods for sequencing RNA are also known (Peattie D A. Proc. Natl. Acad. Sci. USA (1979) 76(4):1760-1764). Other methods include those of Donis-Keller et al. (1977, Nucl. Acids Res. 4:2527-2538), Simoncsits A. et al. (Nature (1977) 269(5631): 833-836), Axelrod V D. et al. (Nucl. Acids Res. (1978) 5(10): 3549-3563), and Kramer F R. and Mills D R. (Proc. Natl. Acad. Sci. USA (1978) 75(11):5334-5338).

Nucleic acid sequences can also be read by stimulating the natural fluoresce of a cleaved nucleotide with a laser while the single nucleotide is contained in a fluorescence enhancing matrix (U.S. Pat. No. 5,674,743); In a mini sequencing reaction, a primer that anneals to target DNA adjacent to a SNP is extended by DNA polymerase with a single nucleotide that is complementary to the polymorphic site. This method is based on the high accuracy of nucleotide incorporation by DNA polymerases. There are different technologies for analyzing the primer extension products. For example, the use of labeled or unlabeled nucleotides, ddNTP combined with dNTP or only ddNTP in the mini sequencing reaction depends on the method chosen for detecting the products.

Template-directed methods—In one example, a template-directed dye-terminator incorporation with fluorescent polarization-detection (TDI-FP) method is described by Freeman B D. et al. (J Mol Diagnostics (2002) 4(4):209-215) for large scale screening; 5' nuclease assay may also be used for genotyping single nucleotide polymorphisms (Aydin A. et al. Biotechniques (2001) (4):920-2, 924, 926-8.); Polymerase proof-reading methods may be used to determine SNPs identities as described in WO 0181631; Detection of single base pair DNA mutations by enzyme-amplified electronic transduction is described in Patolsky F et al. Nat Biotech. (2001) 19(3):253-257.

Sequence-specific PCR methods have also been successfully used for genotyping single nucleotide polymorphisms (Hawkins J R. et al. Hum Mutat (2002) 19(5):543-553). Alternatively, a Single-Stranded Conformational Polymorphism (SSCP) assay or a Cleavase Fragment Length Polymorphism (CFLP) assay may be used to detect polymorphisms as described herein.

Applications of Microfluidic Devices

Microfluidic devices comprising arrays of picoliter or femtoliter reaction chambers as described are useful for biological assays and diagnostics. For example, digital quantification of nucleic acids using hundreds of thousands, to millions, of reactions provides unique capabilities in 1) the discrimination of very small allelic imbalances with high statistical power, 2) the co-localization of target sequences on a single molecule over a long genomic distance and 3) the detection of rare events in a highly homologous genetic background.

Figure 4:
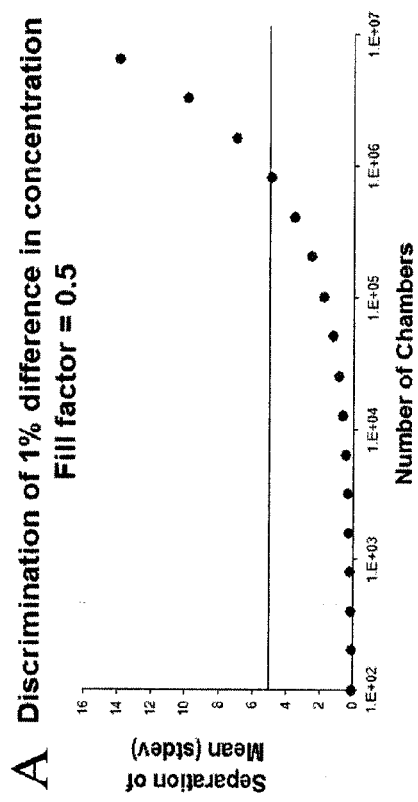
FIG. 4 shows a statistical plot of the scaling of precision and specificity with volume (A) Numerical calculation of the separation in the measured mean of two alleles varying by 1% using digital PCR as a function of the number of chambers. Difference is normalized by the expected standard deviation (sigma) as determined by stochastic binomial noise (sampling noise). Calculation was performed for template concentration corresponding to positive amplification in 50% of reaction chambers. 5 sigma separation is achieved at approximately 1,000,000 chambers. (B) Numerical calculation of the ratio of the efficiency of specific and non-specific amplification as a function of chamber volume for the detection of a rare species present at a frequency of one in a million.

The dynamic range of a digital PCR assay may be described as the range of concentrations over which the number of expected positive reactions increases linearly with template concentration. Without wishing to be bound by theory, the distribution of molecules throughout the array is random, so that a linear response is observed until the mean occupation of each chamber approaches one, resulting in saturation. The dynamic range of a digital array therefore scales with the total number of chambers. Picoliter volume compartmentalization provides an effective enhancement in concentration that may be used to detect rare sequences within a large background of high sequence homology. To illustrate this point consider the task of detecting 10 copies of a single nucleotide polymorphism (SNP) in a background of wild-type at a relative concentration of 1 copy per million (10 copies of the SNP in a background of 10 million wild type). In such a situation even a minute amount of non-specific amplification of the wild type sequence may result a false positive, making detection exceedingly difficult or impossible by any PCR method. However, the partitioning of this sample into 1,000,000 chambers results in an average of 10 copies of the wild-type sequence per reaction chamber. The majority of these reaction chambers will have none of the target sequence but exactly 10 reaction chambers (with high probability) will contain a single copy of the SNP. In such a situation the background may be reduced by a factor of one million and detection of the SNP may be achieved with an assay capable of discriminating only 1 in ten molecules. FIG. 4 shows the volume dependence of the required relative efficiencies of the specific and non-specific reactions required to detect a single molecule in a background of 1 million molecules having high sequence homology. For example, with a 30 cycle PCR reaction and a required signal to noise ratio of 10, as defined by the ratio of specific to non-specific amplicons, the required relative reaction efficiency in a 1 µL reactor is approximately 6×. By comparison, if this same sample is divided into 100,000 reactors having volumes of 10 pL the requisite ratio of reaction efficiencies would be 1.4.

By reducing the reaction volume to a few picoliters and dispersing the nucleic acid in the sample to be present at an average of less than one per reaction, a high effective concentration is provided. This also has the advantage of reducing non-specific amplification and competitive reactions, which would otherwise increase the background.

Digital PCR provides for the ability to use optically multiplexed PCR to measure the frequency of genetic rearrangements that result in two target sequences being present on the same DNA molecule. As molecules are loaded into multiple partitions they distribute themselves randomly and independently. If the sample contains a rare subset of molecules that harbour two target sequences, the co-localization of amplification within the reaction chambers will be higher than expected by chance, indicating the presence of this species. The statistical power of this analysis improves with the total number of chambers so that in the case of very large arrays it is possible to detect minority species that poses both target sequences independent of the exact fusion site. This capability should allow for the detection of a variety of rare genetic rearrangements including gene fusions, transpositions, alternative splicing, and inversions. For example, such an approach may be used for the detection of variants of the well-characterized BCR/ABL fusion oncogene using a single two-colour multiplexed assay. The fusion of BCR on 22q11 with ABL on 9q34 is a well-known chromosomal aberration that is present in 95% of cases of chronic myeloid leukemia (CML) and in approximately 25% of cases of acute lymphoblastic leukemia (ALL) in adults and approximately 2-5% of ALL cases in children (Burmeister et al., 2000. Leukemia 14:1850). The detection of common fusion transcripts by RT-qPCR is routinely used as the gold standard for diagnosis and prognosis. However, the large number of possible breakpoints creates difficulties in designing primers that detect all transcript variants due to the prohibitively long amplicons required to bridge internal exons, rule out the use of a single set of primers. In the vast majority of fusions, exons E1 (BCR) and A11 (ABL) flank the fusion site. A multiplexed assay in which two primer sets were used to independently detect exons E1 and A11 using FRET probes reporting in two separate colours (FAM and Cal Orange) may be used to test for the frequency of co-localization in samples of genomic DNA spiked with serial dilutions of cloned cDNA of cells comprising a BCR/ABL fusion (e.g. chronic mylogenous leukemia primary cells, or a cell line having a similar fusion), to determine the minimum fraction of fusions that give rise to statistically significant enrichment of co-localization.

It will be appreciated by a person of skill in the art that the numerical designations of the positions of a polymorphism within a sequence are relative to the specific sequence. Also the same positions may be assigned different numerical designations depending on the way in which the sequence is numbered and the sequence chosen. Furthermore, sequence variations such as insertions or deletions, may change the relative position and subsequently the numerical designations of particular nucleotides at and around a mutational site.

TABLE 1

Sequences

| SEQ ID NO: | Sequence | Description |
|---|---|---|
| 1 | CCGGTGCCACCTGTGGTCCACCTGACCCTCCG CCAGGCCGGCGACGACTTCTCCCGCCGCTACC GCCGCGACTTCGCCGAGATGTCCAGCCAGCTG C | Response curve template (BCL2) |
| 2 | GCCACCTGTGGTCCACCT | Response curve primer |
| 3 | TGGACATCTCGGCGAAGTCG | response curve primer |
| 4 | FAM-CGACGACTTCTCCCGCCGCT-BHQ | FAM-BHQ labeled probe |
| 5 | CACATTTGGAGGGCACAAAAGTGAGAAGCCGG CTCTGCCTCGGAAGAGGGCAGGGGAGAACAGG TCTGACCAGGTGACCCGAGGCACAGTAACGCC TCCCCCAGGCTGGTGAAAAAGAATGAGGAAG CTGCTGATGAGGTCTTCAAAGACATCATGGAG TCCAGCCCGGGCTCCAGCCCGCCCAACCTGAC TCCAAAACCCCTCCGGC | human ABL11 template |
| 6 | ATTTGGAGGGCACAAAAGTG | ABL11 primer |
| 7 | GGGGGAGGCGTTACTGTG | ABL11 primer |
| 8 | ACAGGTCTGACCAGGTGACC | CalOrange labeled probe |
| 9 | ATCGAGCAGGAGCTGGAG | AIRE primer |
| 10 | TGCCGGTCATAGCTCTTCTT | AIRE primer |

TABLE 1-continued

Sequences

| SEQ ID NO: | Sequence | Description |
|---|---|---|
| 11 | GCTCCAGG | AIRE LNA probe 1 |
| 12 | ATTTGGAGGGCACAAAAGTG | ABL primer |
| 13 | AGGGGTTTTGGAGTCAGGTT | ABL primer |
| 14 | ACAGGTCTGACCAGGTGACC | CalOrange labelled probe for ABL |
| 15 | <none> | |
| 16 | <none> | |
| 17 | AAGCTTTCTCACAAGCATTTGGTTT | forward JAK primer |
| 18 | AGAAAGGCATTAGAAAGCCTGTAGTT | reverse JAK primer |
| 19 | TCTCCACAGACACATAC | wild-type JAK probe (VIC label) |
| 20 | TCCACAGAAACATAC | JAK probe for polymorphism (FAM label) |
| 21 | TCCTCAGAACGTTGATGGCAG | Jak2fwd |
| 22 | ATTGCTTTCCTTTTTCACAAGAT | Jak2rev |

Experimental Methods

Chip Fabrication: The microfluidic polydimethylsiloxane (PDMS) devices were fabricated using standard multilayer soft lithography. Standard lithography is used to pattern the photo resist by utilizing 20,000 dpi transparency masks (CAD/Art Services). Chroma masks were generated for the production of the MegaPixel mold (University of Alberta Nanofab). Negative molds were made using soft lithography SU8-2025 was used for the control layer yielding a channel thickness of 25 micrometers, while SU8-100 was used to create the cubical reaction chambers. Channels 10 um high connect the reaction chambers, fabricated with SU8-5. SPR-220 was spun to achieve a thickness of 10 um was used to create the section of the flow lines that was intersected by valves (Unger M. A. et al., 2000. Science 288:113).

Briefly, a layer of elastomer (5:1 GE RTV) was spin-coated onto a mold (250 rpm×1 min) and partially hardened. A vapor barrier (IPA cleaned transparency) was positioned over the area of the reaction chambers and covered with a ~7 mm layer of elastomer (5:1 GE RTV) and degassed, and baked for 90 min at 80° C. to harden the elastomer, and allowed to cool for 1 hr. The hardened layer of reaction chambers was peeled of the mold and aligned to a control layer of elastomer control layer (20:1 GE RTV previously spin-coated onto a support matrix–500 RPM×30 sec+1875 RPM×90 sec, followed by baking for 45 min at 80° C.). The two layers were baked for 1 hour at 80° C. to bind, cooled and peeled from the support matrix. Ports were punched in the device, and the device mounted to a base layer (20:1 GE RTV, spin-coated as described). The final assembly was baked overnight at 80° C. to harden the elastomer.

The devices are composed of two layers of PDMS bonded to a silicon wafer, with a push up geometry. The flow layer was obtained by first spinning a layer of PDMS (5:1 RTV A:B) at 820 RPM. Polyethylene transparency slides for water vapor control is then positioned on top of the relevant features and about 40 g of PDMS are poured on top of the entire silicon wafer, which is later baked for one hour. For the control layer the wafer is coated with PDMS (10:1 RTV A:B) and spun at 1800 RPM and successively baked for 45 minutes. Control and flow layers are then aligned and baked together.

Chip Operation: The sample to be analyzed is first mixed with all reagents required for the reaction (primers, probes, dNTPs, polymerase, MgCl2) and is then injected into a microfluidic channel structure featuring the large array of lithographically defined chambers. The PCR reaction chambers are firstly pressure filled with PCR reaction mix. The main flow channel is then pressurized with oil.

The geometry of the chambers ensures high surface tension and requires high pressure applied (about 10 PSI) for the fluid to enter. The geometry helps later compartmentalization as after the chambers are filled with aqueous fluid, the pressurization of the flow line results in displacement of the solution by oil only in the connecting channels but not in the chambers themselves.

PCR Assay and Analysis: Unless otherwise noted, all PCR reactions performed using the microfluidic devices of the present invention were run with ABI TAQ FAST master mix, following manufacturer's instructions, with a concentration of probe at 500 nM for FAM probes and 250 nM for Cal Orange probes. A surfactant (0.1% TWEEN-20) was added to the reaction mix. Each primer was at a concentration of 750 nM. The thermocycling protocol included a 20 second hot start and 40 cycles of 95 degrees for 1 second and 60 degrees for 30 seconds. Thermal cycling and imaging were performed using a BioMark™ System (Fluidigm). End point measurements were obtained and the images were analyzed using Matlab. The template (target DNA) comprised a portion of the human BCL2 gene according to SEQ ID NO: 1, synthesized and PAGE purified by IDT (Integrated DNA Technologies). This template had previously demonstrated 100% PCR efficiency by Real Time PCR. The primers used are GCCACCT-GTGGTCCACCT (SEQ ID NO: 2) and TGGACATCTCG-GCGAAGTCG (SEQ ID NO: 3) and the probe FAM-CGACGACTTCTCCCGCCGCT-BHQ (SEQ ID NO: 4), all synthesized from IDT.

To monitor device-to-device variation a control was used in a different color assay as follows. A template from the human ABL11 gene (SEQ ID NO: 5) was synthesized and PAGE purified by IDT. The following primers were synthesized from IDT: ATTTGGAGGGCACAAAAGTG (SEQ ID NO: 6) and GGGGGAGGCGTTACTGTG (SEQ ID NO: 7). The following probe in CalOrange was synthesized by Biosearch Technologies: ACAGGTCTGACCAGGTGACC (SEQ ID NO: 8).

Trisomy 21 differentiation: A region on the AIRE gene on chromosome 21 was targeted with the following primers and probe: ATCGAGCAGGAGCTGGAG (SEQ ID NO: 9), TGCCGGTCATAGCTCTTCTT (SEQ ID NO: 10) and LNA probe 1 (GCTCCAGG) (SEQ ID NO: 11) from Roche Diagnostics.

The ABL gene on chromosome 9 was targeted with the following primers and probe: ATTTGGAGGGCA-CAAAAGTG (SEQ ID NO: 12), AGGGGTTTTGGAGT-CAGGTT (SEQ ID NO: 13) (synthesized by IDT) and CalOrange-ACAGGTCTGACCAGGTGACC-BHQ1 (SEQ ID NO: 14) from Biosearch Technologies. Genomic DNA was spiked with 6% of pure trisomy 21 DNA, obtained from the Child and Family Research Institute, Vancouver, BC. The final DNA sample used in the digital PCR reaction was set to obtain about 20% fill factor. A device with 90,000 chambers was used for this application.

JAK2 Assay:

Jak2 wildtype and mutant plasmids were created from amplicons derived from a heterozygous patient. Briefly, a 453 bp target was amplified using primers, Jak2fwd TCCTCA-GAACGTTGATGGCAG (SEQ ID NO: 21), and Jak2rev ATTGCTTTCCTTTTTCACAAGAT (SEQ ID NO: 22). The conditions for amplification were 50° C. annealing temperature at 3.5 mM $MgCl_2$ concentration starting with 100 ng of genomic DNA. PCR products were run on a 7% polyacrylamide get to verify correct size fragments. Subcloning was achieved using a TOPO TA subcloning kit (Invitrogen), following manufacturer's instructions. Briefly, one ul of PCR product was combined with 1 ul of buffer solution and 1 ul of linearized, activated vector and 3 ul of $dH_2O$ incubated at room temperature for 5 minutes and then placed on ice. Four μl of the cloning reaction was mixed with one aliquot of component cells provided with the kit and incubated on ice for 5 minutes. Fifty μl of the transfection reaction was plated on a LB ampicillin plate and grown overnight at 37° C. Ten single colonies were picked into LB amp media for overnight growth and subsequent DNA isolation.

Plasmid DNA was isolated using Qiagen Midi plasmid purification kit. DNA from the ten single colonies were individually test in a Taqman based allelic discrimination assay (Applied Biosystems). One each of a Jak2 wildtype (plasmid A) and Jak2 mutant (plasmidB) were further isolated for on going studies.

The plasmids were used as template with a constant background of wildtype (wt or WT) and increasing amounts of mutant (mt or MT) (from 1:1 wt:mt to 1:1000). Primers and probes at a final concentration of 750 nM were used in the reaction, with the following sequences:

```
Forward primer
AAGCTTTCTCACAAGCATTTGGTTT         (SEQ ID NO: 17)

Reverse primer:
AGAAAGGCATTAGAAAGCCTGTAGTT        (SEQ ID NO: 18)

Probes (MGB)
WT TCTCCACAGACACATAC       (VIC) (SEQ ID NO: 19)

MT TCCACAGAAACATAC         (FAM) (SEQ ID NO: 20)
```

The concentration of wildtype was about 0.5 plasmids per chamber. A device with 90,000 chambers and five inlet lines was used for this application. 40 cycles of PCR were applied and the number of positive chambers was counted by using a Matlab program.

Example 1

Amplification of Target Nucleic Acid in a Large Scale Microfluidic Emulsion Array A device incorporating selected coverage by a vapour barrier was used to demonstrate the effects of the evaporation during a PCR experiment. A microfluidic device having the chamber geometry illustrated in FIG. 2d with a chamber density of 1 chamber/1600 $um^2$ was designed with 5 separate chamber arrays in order to test different samples on the same chip. The PCR solution was introduced into the device and compartmentalized as outlined in FIG. 3. A standard TaqMan assay for GAPDH along with TaqMan mastermix (Applied Biosystems) was used to monitor the progress of the reaction with a concentration of template DNA of about 10 copies per reaction chamber. The reaction was allowed to progress over 40 cycles and the end point picture is shown in FIG. 5.

Figure 5:
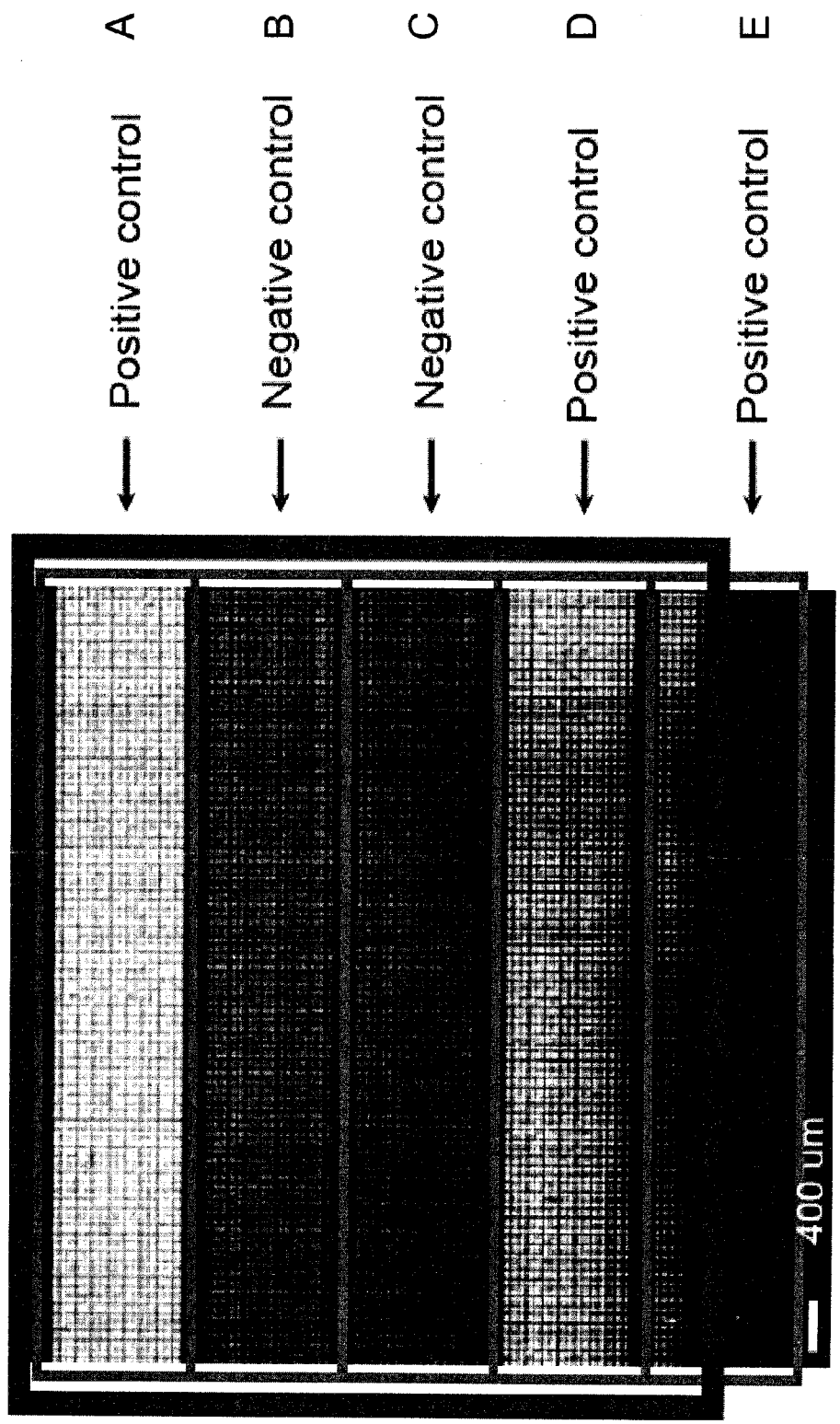
FIG. 5 shows a fluorescent image of GAPDH amplification from genomic DNA loaded at 10 copies per chamber (positive control) and no template control (negative control) samples. The narrow lines outline a set of reaction chambers connected the same flow channel. The thick line shows the boundary of the vapour barrier. Edge effect of failed amplification due to sample dehydration is visible at the bottom of the device. PCR reactions in positive control reaction chambers (regions A, D and E) comprised target DNA and necessary reagents for amplification, while the negative control reaction chambers in regions B and C lacked target DNA. Bright regions indicate successful PCR amplification of target DNA.

The photomicrograph of FIG. 5 shows the results of one experiment. Reaction chambers with positive controls covered by the vapor barrier (positive control regions A and D) were successful in amplification of the target nucleic acid, while reaction chambers with positive controls outside the region covered by the vapor barrier (a portion of Positive control region E) were not successful in amplification.

By incorporating a vapor barrier into the microfluidic device, we have demonstrated reliable single molecule amplification in arrays of up to 90,000 reaction chambers, having volumes of about 30 picoliters.

Example 2

Single-Copy Amplification of Target DNA

By diluting the initial DNA (target nucleic acid) such that each reaction chamber contains only one molecule of DNA or none, it was possible to quantitatively identify the initial amount of DNA present in the sample. Only a reaction chamber with a copy of the target nucleic acid will provide a fluorescent signal for detection, as each chamber that has an optical signal indicates the presence of a target nucleic acid prior to PCR amplification.

Figure 6:
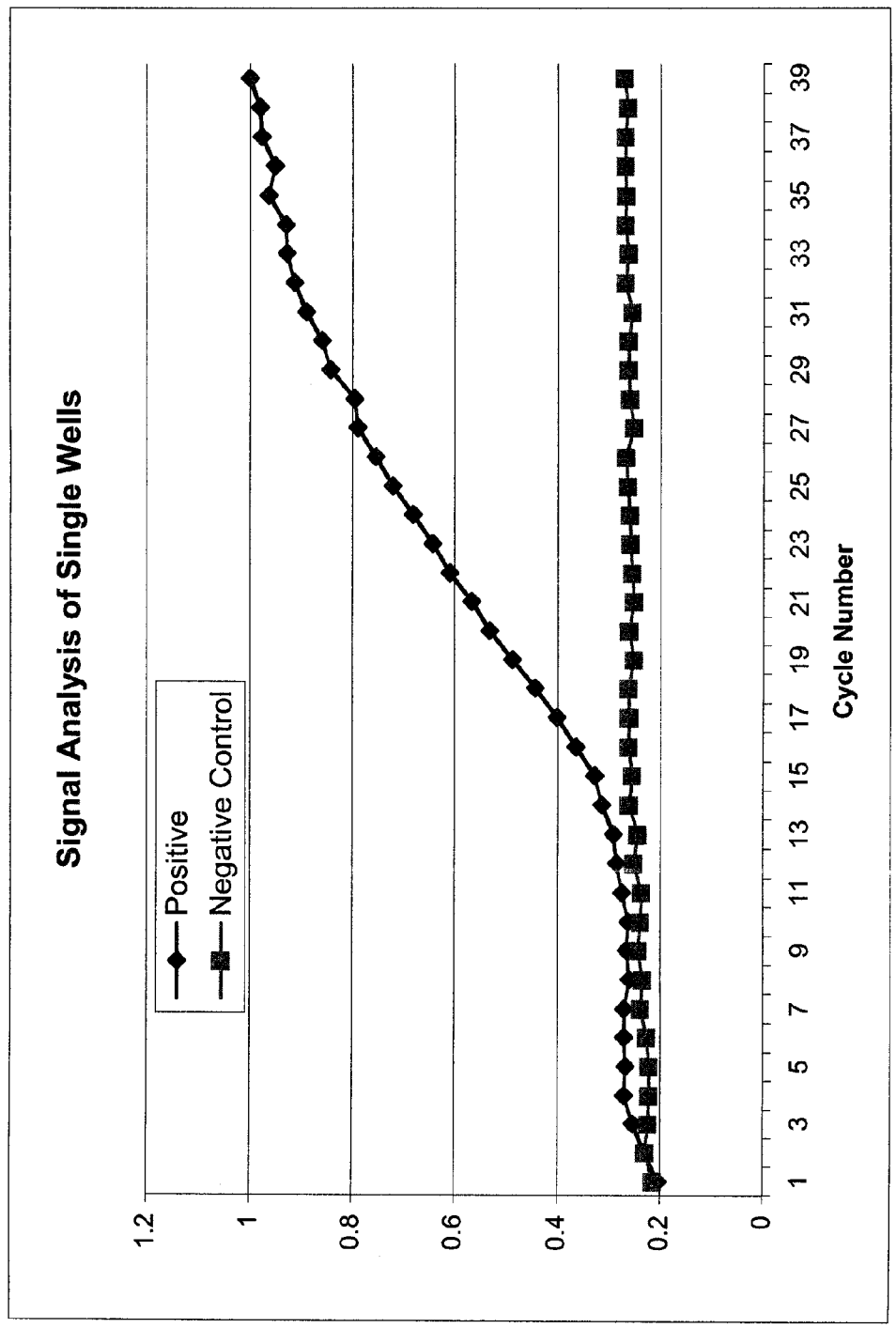
FIG. 6 shows an amplification plot of a PCR reaction in a microfluidic device according to the present invention.

As described, the microfluidic chip was loaded by connecting the fluid lines to a pressurized reservoir of PCR solution containing diluted DNA. After all the chambers were filled, Fluorinert™ oil was pressurized in the main flow lines thereby displacing the fluid everywhere except in the chambers, and the chip ready to be thermocycled. As the PCR reaction proceeds, images of the chip were taken at each cycle. It is therefore possible to see the DNA product (by means of the fluorescent signal) increasing through each cycle. This is demonstrated in FIG. 6. The reaction chamber was 30 micrometers per side. As the cycle number advances, signal from the negative control reaction chambers remains at background, while the signal from positive controls increases exponentially.

We have demonstrated that, by running digital PCR on a chip with a million reaction chambers it is possible to count DNA molecules very accurately due to the highly increased dynamic range. In particular this type of analysis is essential for counting rare gene expression products against a known control. Due to the possibility of using several different probes it is possible to quantitatively identify the expression profile over several genes.

Example 3

Discrimination of Small Allelic Imbalances: Non-Invasive Detection of Fetal Trisomy 21

Minor imbalances in chromosome number were detected using digital PCR techniques employing the microfluidic arrays described herein. In order to determine a 1.5% increase in C21 in a sample, approximately 900,000 PCR reactions were required for 5 sigma certainty:

$$n_{C21} - n_{C15} = m\varepsilon = k\sigma = k\sqrt{n_{C21}} \quad \varepsilon = 1.5\%$$

$$n_{C21} = N_{Chamb} p(1+\varepsilon) \quad n_{C21} = m(2+\varepsilon)$$

$$k = \frac{\varepsilon\sqrt{N_{Chamb} p(1+\varepsilon)}}{2+\varepsilon} = 5 \Rightarrow N = 895{,}570 \text{ chambers}$$

M is the number of genomic equivalents (1 genome set=two of each chromosome). The sampling noise sigma is the square root of the number of chromosome 21. As discussed, if conventional PCR techniques are used, this number of reactions is prohibitively large and effectively impossible. Use of a microfluidics array comprising $10^6$ reaction chambers condenses this number of reactions into a scale that is possible and effective.

Figure 7:
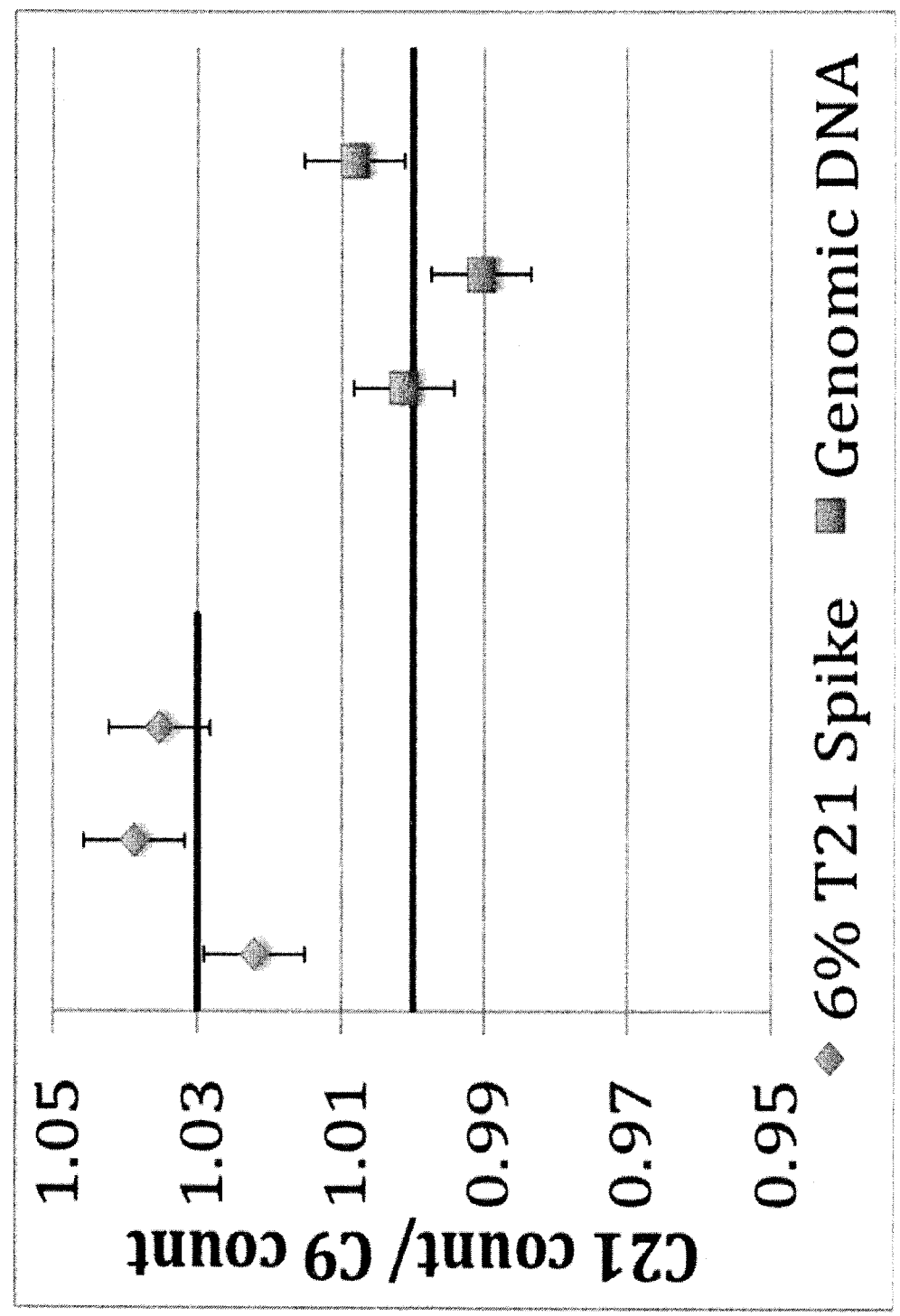
FIG. 7 shows the results of the detection of 3% increase of chromosome 21 (C21) with respect to chromosome 9 (C9), using a planar emulsion array of the present invention. A genomic DNA sample was spiked with 6% trisomy 21 DNA ultimately leading of an increase of 3% of C21 relative to C9 (solid diamond). Pure genomic DNA from a chromosomally normal individual has a 1:1 ratio of C21:C9 (solid square).

Copy number of chromosomes 21 (C21) and 9 (C9) were determined using digital detection of the AIRE gene and ABL genes known to be present at single copy on chromosomes 21 and 9 respectively. Measurements over 90,000 digital chambers of samples spiked with 6% trisomy 21 DNA, displayed the expected 3% enrichment of the AIRE gene when normalized by counts obtained in normal genomic samples (FIG. 7). These measurements represent the highest discriminatory power of any PCR technology reported to date and may be extended in a straight forward manner to the detection of differences below 1%. Interestingly, measurements of AIRE and ABL in normal genomic DNA displayed consistent differences in the absolute number of positive reaction chambers.

Example 4

Detection of Rare Sequences in Large Homologous Background: JAK2 Assay

As a proof of concept plasmid samples containing SNP mutations in the Jak2 gene (V617F) were analyzed. The V617F mutation is specific for several myeloproliferative disorders, such as polycythemia vera, essential thrombocythemia, idiopathic myelofibrosis and several leukemias. Plasmids containing the wild-type Jak2 gene or the V617F variant were tested with probes specific for the SNP region while using common primers. A probe in FAM was used to test the SNP while a probe in VIC was used to the V617F mutant. Samples containing different amounts of mutant over a constant wild type background were tested, and the assays were able to detect ratios as small as 1:1000 mutant to wild-type, compared to a minimum of 5:100 as reported by literature (Bosdquet et al., 2006. Hum Pathol 37:1458). These results are shown in FIG. 8A,B.

Picoliter volume compartmentalization provided an effective enhancement in concentration that may be used to detect rare sequences within a large background of high sequence homology. The detection of a few copies of a single nucleotide polymorphism (SNP) in a background of wild-type at a relative concentration of 1 copy per thousand (1 copy of the SNP in a background of 1000 wild type) is not easily detected with non-digital techniques. In such a situation, even a minute amount of non-specific amplification of the wild type sequence will result a false positive, making detection exceedingly difficult or impossible by any PCR method. However, the partitioning of this sample into 100,000 chambers resulted in an average of 100 copies of the wild-type sequence per reaction chamber. The majority of these reaction chambers had none of the target nucleic acid, but 100 reaction chambers (with high probability) contained a single copy of the target nucleic acid comprising the SNP. In such a situation the background is thus reduced by 4 orders of magnitude, and detection of the SNP may be achieved with an assay capable of discriminating only 1 in ten molecules.

Example 5

Application of Microfluidic Arrays to Generation of Sequencing Libraries

Sequencing libraries may be generated for use with automated sequencing machines or systems that rely on sequencing by extension or sequencing by ligation. A key step in these sequencing technologies is the localized amplification of single molecules prior to sequencing. In this step single molecules of the DNA template to be sequenced may be isolated from their neighbours and subject to amplification using polymerase chain reaction or rolling cycle amplification. As an example, a microfluidic device according to the present invention may be loaded with micron scale beads at a concentration chosen to give several beads per chamber. A device comprising about 10,000,000 reaction chambers may be loaded with a suspension of beads in a PCR reaction mix comprising target nucleic acid at a concentration of about 0.1 to about 0.5. A sufficient quantity of beads is provided to average about 5 beads per chamber. Based on Poisson statistics this loading would result in approximately 1,000,000 chambers each having sample in them with approximately 95% of these containing single templates, and nearly all of them having at least one bead (average of 5). After amplification the beads may be removed from the chambers. Examples of methods for removing the beads from the chambers include a wash step or peeling the microfluidic device off the support (e.g glass). The beads may be recovered for sequencing. This would in a library of approximately 5,000,000 beads, of which about 95% are attached to a unique sequence, representing a total sample size of approximately 1,000,000 molecules. The size of these libraries may further be increased by the fabrication of devices having more chambers or by the use of multiple devices.

All citations are herein incorporated by reference.

One or more currently preferred embodiments have been described by way of example. It will be apparent to persons skilled in the art that a number of variations and modifications can be made without departing from the scope of the invention as defined in the claims.

What is claimed is:

1. A microfluidic device comprising:
a polymer substrate comprising a plurality of blind reaction chambers in coplanar array;
a flow channel having an inlet at a first end and an outlet at a second end; and
a vapor barrier substrate impermeable to water vapor and applied in a parallel plane to the plurality of blind reaction chambers and separated from the blind reaction chambers by a layer of polymer of the polymer substrate;
wherein each blind reaction chamber is in fluid communication with the flow channel at a location in between the inlet and outlet, and wherein the polymer substrate is vapor permeable and the layer of polymer has a sufficient thickness to absorb gases displaced from the blind reaction chambers by a liquid that fills the blind reaction chambers and wherein the vapor barrier substrate and layer of polymer have a geometry that establishes a substantially two dimensional gradient of water vapor such that evaporation only occurs through one or more sides of the polymer substrate.

2. The device of claim 1, further comprising a plurality of valves disposed along the flow channel, each of the plurality of valves comprising one or more control channels intersecting the flow channel.

3. The device of claim 2 wherein the valves are positioned at the first and second ends of the flow channel.

4. The device of claim 1 wherein the reaction chambers have a volume between about 1 fL and about 1000 fL.

5. The device of claim 1 wherein the reaction chambers are about 10 pL to about 100 pL volume.

6. The device of claim 1 wherein the reaction chamber has one or more pre-deposited reagents.

7. The device of claim 1 wherein the blind reaction chambers in coplanar array have a pitch of less than about 100 μm.

8. The device of claim 1 wherein the layer of polymer has a thickness of about 10 μm to about 500 μm.

9. The device of claim 1 wherein the reaction chambers are present at a density of 5000 or greater chambers/cm$^2$.

10. A microfluidic device comprising:
a polymer substrate comprising a plurality of blind reaction chambers in coplanar array;
a flow channel having an inlet at a first end and an outlet at a second end;
a vapor barrier substrate impermeable to water vapor and applied in a parallel plane to the plurality of blind reaction chambers and separated from the blind reaction chambers by a layer of polymer of the polymer substrate;
wherein each blind reaction chamber is in fluid communication with the flow channel at a location in between the inlet and outlet, and wherein the polymer substrate is vapor permeable and the layer of polymer has a sufficient thickness to absorb gases displaced from the blind reaction chambers by a first liquid that fills the blind reaction chambers and wherein the vapor barrier substrate and layer of polymer have a geometry that establishes a substantially two dimensional gradient of water vapor such that evaporation only occurs though one or more sides of the polymer substrate; and
wherein each of the plurality of blind reaction chambers contains the first liquid and is bounded by walls of the polymeric substrate and wherein a second liquid in the flow channel is immiscible with the first liquid and forms a liquid barrier preventing liquid communication of the first liquid between two or more reaction chambers.

11. The device of claim 10, further a plurality of valves disposed along the flow channel, each of the plurality of valves comprising one or more control channels intersecting the flow channel.

* * * * *